US012782951B2

(12) United States Patent
Jhunjhunwala et al.

(10) Patent No.: US 12,782,951 B2
(45) Date of Patent: Nov. 3, 2026

(54) ULTRASONIC DATA AUGMENTATION FOR AUTONOMOUS SYSTEMS AND APPLICATIONS

(71) Applicant: NVIDIA Corporation, Santa Clara, CA (US)

(72) Inventors: Aman Jhunjhunwala, Toronto (CA); Arthur Henry Rajala, Anniston, AL (US); Gyeong Woo Cheon, San Jose, CA (US); Qian Lin, Berkley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 204 days.

(21) Appl. No.: 18/636,579

(22) Filed: Apr. 16, 2024

(65) Prior Publication Data

US 2025/0321580 A1 Oct. 16, 2025

(51) Int. Cl.

| | |
|---|---|
| ***G05D 1/242*** | (2024.01) |
| ***G05D 1/246*** | (2024.01) |
| ***G05D 101/15*** | (2024.01) |
| ***G05D 111/20*** | (2024.01) |

(52) U.S. Cl.

CPC ............. *G05D 1/242* (2024.01); *G05D 1/246* (2024.01); *G05D 2101/15* (2024.01); *G05D 2111/20* (2024.01)

(58) Field of Classification Search

CPC .... G05D 1/242; G05D 1/246; G05D 2101/15; G05D 2111/20; G01C 21/3841; G01S 7/539; G01S 15/86; G01S 15/87; G01S 15/89

See application file for complete search history.

(56) References Cited

U.S. PATENT DOCUMENTS

| | | | | |
|---|---|---|---|---|
| 11,688,074 | B2 | 6/2023 | Puri et al. | |
| 2006/0208169 | A1* | 9/2006 | Breed .................. | B60N 2/0022 250/221 |
| 2021/0101624 | A1* | 4/2021 | Philbin ................. | G06F 18/251 |
| 2021/0406560 | A1* | 12/2021 | Park ...................... | G01S 13/862 |
| 2022/0066456 | A1* | 3/2022 | Ebrahimi Afrouzi ........................ | A47L 9/0477 |
| 2022/0101112 | A1 | 3/2022 | Brown et al. | |
| 2022/0122001 | A1 | 4/2022 | Choe et al. | |

(Continued)

*Primary Examiner* — Nga X Nguyen

(74) *Attorney, Agent, or Firm* — IRON SUMMIT IP LLP

(57) ABSTRACT

In various examples, ultrasonic data augmentations for autonomous and/or semi-autonomous systems and applications are described herein. Systems and methods described herein may use sensor data generated using one or more ultrasonic sensors to generate augmented input data for training one or more machine learning models to generate one or more representations (e.g., one or more maps) of an environment. As described herein, the sensor data may be augmented using one or more techniques such that the augmented input data corresponds to various driving environments (e.g., different driving surfaces), various poses on machines (e.g., different locations and/or orientations), and/or includes additional information associated with the ultrasonic sensor(s) and/or the sensor data. The systems and methods described herein may further use a new architecture to generate input data for the machine learning model(s), where the input data better represents the environment surrounding a machine executing the machine learning model(s).

19 Claims, 21 Drawing Sheets

(56) References Cited

U.S. PATENT DOCUMENTS

| | | | | |
|---|---|---|---|---|
| 2023/0095410 | A1* | 3/2023 | Costea .................. | G01S 17/931<br>356/5.01 |
| 2024/0183752 | A1 | 6/2024 | Hong et al. | |

* cited by examiner

FIGURE 3B
INPUT DATA
318
AREAS
320
AREAS
322
AREAS
324

ULTRASONIC DATA AUGMENTATION FOR AUTONOMOUS SYSTEMS AND APPLICATIONS

BACKGROUND

Generating maps or other environmental representations-such as free-space maps and occupancy maps—is essential for autonomous and/or semi-autonomous machine navigation. For instance, these dynamically generated representations of the environment may include a birds-eye-view (BEV) perspective of an area surrounding an autonomous and/or semi-autonomous machine, where the BEV representation indicates locations of static and/or dynamic objects that are proximate to the autonomous and/or semi-autonomous machine and/or indicates drivable (e.g., free-space) and non-drivable regions of the environment. As such, the autonomous and/or semi-autonomous machine may use these representations to determine the locations of the objects within the environment as well as where the machine is capable of navigating, and may use this information to determine planning and control operations for navigating safely through the environment.

Some conventional techniques may use specific types of sensor data, such as ultrasonic data generated using one or more ultrasonic sensors, to generate these representations. For instance, one or more machine learning models may be trained to process the ultrasonic data generated using the ultrasonic sensor(s) and, based at least on the processing, generate the representations. However, training such a machine learning model(s) to effectively generalize all possible scenarios and objects when generating these representations may be difficult. For example, based on the training, the machine learning model(s) may have biases based on which ultrasonic sensors of machines generated the training data (e.g., the front ultrasonic sensors of machines, but not the back ultrasonic sensors), types of roads the machines navigated when generating the training data (e.g., dirt roads, but not asphalt roads or brick roads), and/or poses of the ultrasonic sensors that are specific to types of machines that generated the training data.

SUMMARY

Embodiments of the present disclosure relate to ultrasonic data augmentations for autonomous and/or semi-autonomous systems and applications. Systems and methods described herein may use sensor data generated using one or more ultrasonic sensors to generate augmented input data for training one or more machine learning models to generate one or more representations (e.g., one or more maps) of an environment. As described herein, the sensor data may be augmented using one or more techniques such that the augmented input data corresponds to various driving environments, such as different driving surfaces, and/or various poses on machines, such as different locations and/or orientations. The ultrasonic data may also be augmented to include additional information associated with the ultrasonic sensor(s), histograms represented by the sensor data, and/or so forth. The systems and methods described herein may further use a new architecture to generate the input data for the machine learning model(s), where the input data better represents the environment surrounding a machine executing the machine learning model(s). This way, the outputs from the machine learning model(s) may also improve, such that the machine may use the outputs to perform one or more operations (e.g., control, planning, world model management, navigation, etc.).

In contrast to conventional systems, the systems of the present disclosure may generate augmented input data that represents various driving environments, various machine poses, and/or additional information, and then use the augmented input data to train the machine learning model(s). This way, the machine learning model(s) of the present disclosure may be less biased when generating maps (and/or other representations) as compared to the machine learning model(s) of the conventional systems. For instance, the machine learning models(s) of the present disclosure may generate more accurate or precise maps even when machines navigate different driving surfaces and/or include ultrasonic sensors at different or varying locations, poses, and/or orientations on the machines. Additionally, in contrast to the conventional systems, the systems of the present disclosure may use the new architecture to generate input data for the machine learning model(s), where the new architecture may provide additional channels and/or information for generating more accurate or precise input data. As described in more detail herein, by processing the more accurate or precise input data, the machine learning model(s) may also generate maps (and/or other representations) that better represent the surrounding environment, such as the locations of objects and/or features within the environment.

BRIEF DESCRIPTION OF THE DRAWINGS

The present systems and methods for ultrasonic data augmentation for autonomous and semi-autonomous systems and applications are described in detail below with reference to the attached drawing figures, wherein.

DETAILED DESCRIPTION

Figure 1:
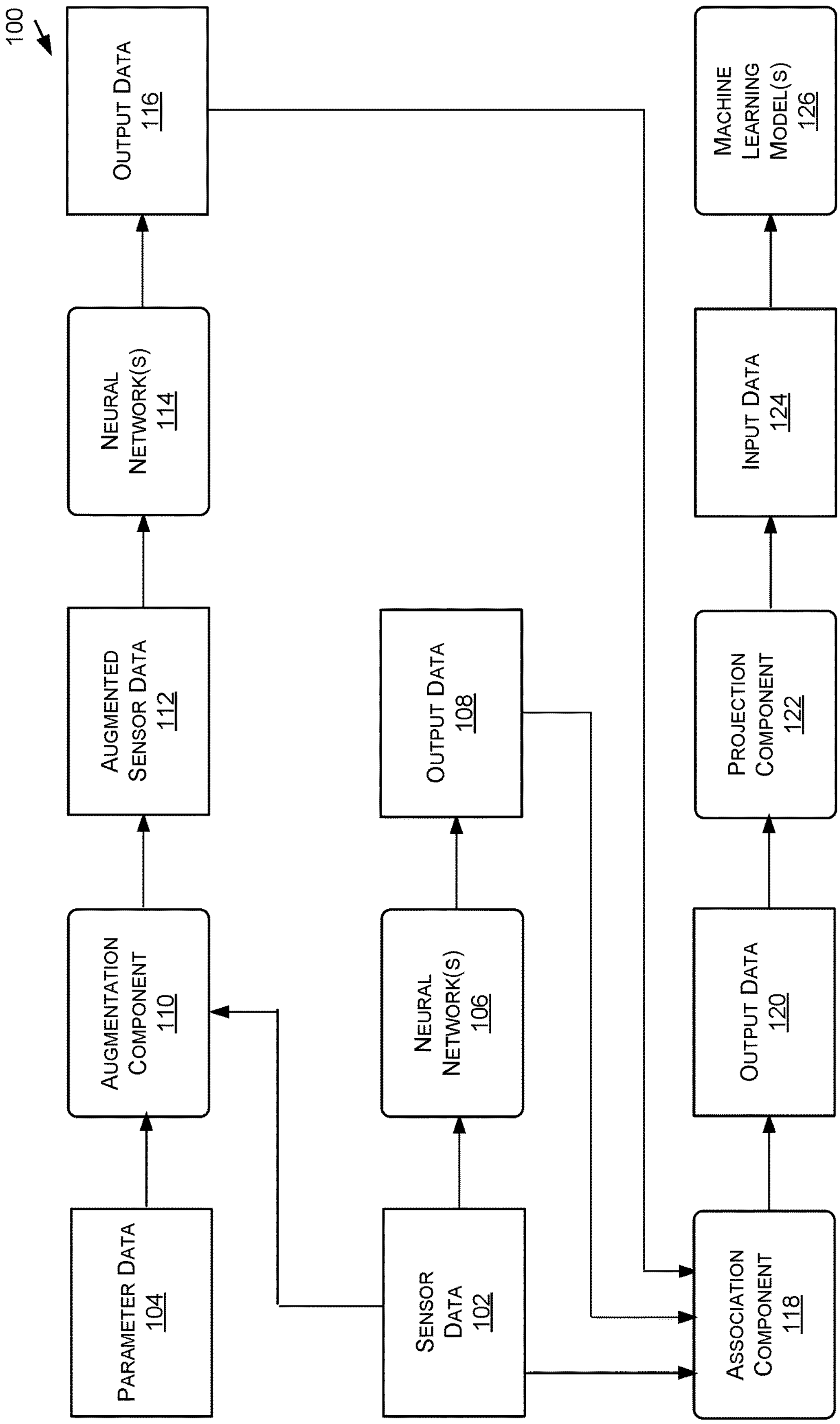
FIG. 1 illustrates an example data flow diagram for a process of augmenting ultrasonic data in order to perform one or more processes, in accordance with some embodiments of the present disclosure.

Systems and methods are disclosed related to ultrasonic data augmentation for autonomous and semi-autonomous systems and applications. Although the present disclosure may be described with respect to an example autonomous or semi-autonomous vehicle or machine 1100 (alternatively referred to herein as "vehicle 1100," "ego-vehicle 1100," "ego-machine 1100," or "machine 1100," an example of which is described with respect to FIGS. 11A-11D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to sensor data augmentation and/or map generation for autonomous or semi-autonomous systems and applications, this is not intended to be limiting, and the systems and methods described herein may be used in augmented reality, virtual reality, mixed reality, robotics, security and surveillance, autonomous or semi-autonomous machine applications, and/or any other technology spaces where object detection and/or map creation may be used.

For instance, a system(s) may receive sensor data (also referred to, in some examples, as "ultrasonic data") generated using one or more ultrasonic sensors of one or more machines navigating within an environment. As described in more detail herein, the sensor data may represent at least histograms indicating information associated with the environment, such as the locations, classifications, poses, etc. of objects and/or features within the environment. Additionally, in some examples, the system(s) may receive data representing information associated with the ultrasonic sensor(s), such as one or more extrinsic parameters (e.g., the location(s), the orientation(s), etc.), one or more intrinsic parameters (e.g., frequency, resolution, gain, etc.), one or more identifiers, one or more fields-of-view (FOV(s)), one or more modes (e.g., one or more firing models, etc.), one or more reverberation timings, one or more temperatures, and/or any other information associated with the ultrasonic sensor(s).

The system(s) may then process at least a portion of the sensor data in order to generate input data for one or more machine learning models. As described herein, the input data may represent an image (e.g., a top-down image, a birds-eye-view (BEV) image, etc.), a map (e.g., a top-down map, a BEV map, an occupancy map, a height map, etc.), an envelope, a projection (e.g., a range image), and/or any other type of representation that indicates one or more locations of one or more objects and/or features relative to the machine(s) that generated the sensor data. In some examples, the system(s) may process every frame of the sensor data, every other frame of the sensor data, every fourth frame of the sensor data, and/or may process the frames at any interval or rate when generating the input data. As described in more detail herein, the system(s) may use any technique to process the sensor data in order to generate the input data for the machine learning model(s).

For instance, the system(s) may use an architecture that includes processing the sensor data using one or more different processing paths. For instance, in some examples, a first path may include directly processing the sensor data to generate first input data. Additionally, a second path may then include initially processing the sensor data using one or more neural networks (e.g., a one-dimensional (1D) convolution, a two-dimensional (2D) convolution, etc.) in order to generate an output that is then processed to generate second input data. Furthermore, a third path may include adding (e.g., augmenting) the sensor data with information, processing the augmented sensor data using one or more neural networks (e.g., a 1D convolution, a 2D convolution, etc.) in order to generate an output, and then processing the output to generate third input data. As described herein, in some examples, the architecture may include one of the paths, two of the paths, and/or all three of the paths to generate the input data. Additionally, in some examples, the sensor data, the output from the second path, and/or the output from the third path may be combined (e.g., concatenated, etc.) before generating the input data.

As described herein, in some examples, the third path may include augmenting the sensor data with the information. In some examples, at least a portion of the information may be associated with the ultrasonic sensor(s) such as, but not limited to, one or more of the extrinsic parameter(s) (e.g., the location(s), the orientation(s), etc.), one or more of the intrinsic parameter(s), one or more of the identifier(s), an indication of one or more of the FOV(s), an indication of the mode(s), an indication of the reverberation timing(s), an indication of the temperature(s), and/or the like. Additionally, or alternatively, in some examples, at least a portion of the information may be associated with the sensor data such as, but not limited to, an indication of one or more bin locations associated with one or more median peak amplitude values associated with one or more sliding windows, an indication of one or more bin locations associated with one or more peak amplitude values associated with the sliding window(s), an indication of one or more distances associated with one or more bins, an indication of one or more running variance amplitude values associated with one or more bins, an indication of one or more running mean amplitude values associated with one or more bins, and/or any other information. While this example describes augmenting the sensor data associated with the third path with this information, in other examples, the system(s) may augment at least a portion of the input data with the information (e.g., add the information to one or more channels associated with the input data).

In some examples, the system(s) may then process the input data using the machine learning model(s). Based at least on the processing, the machine learning model(s) may generate and/or output data representing one or more locations of one or more objects located within the environment. As described herein, the output may include, but is not limited to, a height map(s), an occupancy map(s), a height/occupancy map(s), a distance map(s), and/or any other type of map. In some examples, one or more of the maps may include a BEV map, a top-down map, and/or the like. In some examples, the machine learning model(s) may be trained to output a single map, such as a single occupancy map, a single height map, a single height/occupancy map, or a single distance map. In some examples, the machine learning model(s) may be trained to output multiple maps and/or other output representations. For a first example, the machine learning model(s) may be trained to output a height map and an occupancy map. For a second example, the machine learning model(s) may be trained to output multiple height maps, such as a first height map associated with a first portion of the input data, a second height map associated with a second portion of the input data, and/or so forth.

As also described herein, in order to improve the performance of the machine learning model(s), the system(s) may train the machine learning model(s), the neural network(s) used in the second path, and/or the neural network(s) used in the third path using augmented ultrasonic data (e.g., augmented sensor data, augmented input data, etc.). For instance, the system(s) may use one or more techniques to generate the augmented ultrasonic data using the sensor data and/or the input data. For a first example, such as to simulate different types of driving surfaces, the system(s) may add noise, gaussian blurring, and/or any other artifacts to the sensor data to generate augmented sensor data. In some examples, the system(s) may augment the sensor data using various types of noise, such as low frequency noise and/or high frequency noise. For instance, with regard to high frequency noise and for sensor data representing a histogram, the system(s) may add a first amount of noise (e.g., 0.05, 0.1, etc.) to a first number of bins associated with the histogram. Additionally, with regard to low frequency noise and for sensor data representing a histogram, the system(s) may add a second amount of noise (e.g., 0.4, 0.5, etc.) to a second number of bins associated with the histogram. In some examples, the second amount of noise is greater than the first amount of noise and/or the second number of bins is less than the first number of bins.

For a second example, such as to simulate objects located at different locations around machines, the system(s) may cause the input data to “flip” and/or “rotate” such that the ultrasonic sensors are located at different poses (e.g., locations, orientations, etc.) on the machines. For instance, in some examples, and for a representation (e.g., an image) represented by the input data, the system(s) may generate augmented input data by causing the representation to rotate by a given amount (e.g., 45 degrees, 90 degrees, 180 degrees, etc.) with respect to a machine, flip such that an object(s) located on a first side of the machine is now located on a second side of the machine and/or an object(s) located on the second side of the machine is not located on the first side of the machine(s), and/or using any other technique. Additionally, or alternatively, in some examples, the system(s) may cause the rotation and/or the flipping based at least on updating a projection matrix associated with the input data. Furthermore, as described in more detail herein, when performing this type of augmentation, then system(s) may also update ground truth data associated with the augmented ultrasonic data to represent the same type of rotation and/or flipping.

For a third example, such as to simulate different orientations (e.g., FOVs) associated with the ultrasonic sensors, the system(s) may cause the input data to simulate noise at other yaw angles associated with the ultrasonic sensors. In some examples, and for input data representing a representation, the system(s) may simulate the noise by updating a projection matrix associated with the input data to indicate a new yaw angle associated with an ultrasonic sensor. In some examples, the system(s) may update the yaw angle by a given amount. For instance, if the system(s) is training the machine learning model(s) for ultrasonic sensors that include a 2 degrees difference in yaw angle as compared to the ultrasonic sensors that generated the sensor data, then the machine learning model(s) may update the yaw angle by at least 2 degrees.

The system(s) may also generate ground truth data associated with the input data (e.g., the augmented ultrasonic data), which may include training data, for the machine learning model(s). For example, the ground truth data may indicate the actual locations of objects located within the environment and surrounding the machine(s). As described herein, in some examples, similar to the output from the machine learning model(s), the ground truth data may include, but is not limited to, a height map(s), an occupancy map(s), a height/occupancy map(s), a distance map(s), and/or any other type of map and/or representation. Additionally, in some examples, such as for ground truth data that is associated with training data generated using the second augmentation example above, the system(s) may update the ground truth data to match the rotation and/or flipping associated with the augmentation of the input data. The system(s) may then use the training data and the ground truth data to train the machine learning model(s).

For instance, the system(s) may apply the training data to the machine learning model(s). The machine learning model(s) may then process the training data and, based at least on the processing, generate outputs representing estimated locations, classifications, poses, etc. of objects and/or features located within the environment. For instance, the outputs may include, but are not limited to, a height map(s), an occupancy map(s), a height/occupancy map(s), a distance map(s), and/or any other type of map and/or representation. The system(s) may then determine one or more losses associated with the outputs based at least on the estimated locations of the objects and the actual locations of the objects as represented by the ground truth data. Additionally, the system(s) may update the parameters (e.g., biases and/or weights) associated with the machine learning model(s) based at least on the loss(es). While this is just one example technique of how the system(s) may train the machine learning model(s) using the training data and the ground truth data, in other examples, the system(s) may train the machine learning model(s) using any other technique.

As described herein, in some examples, the system(s) may use the architecture to cause one or more machines to perform one or more operations. For instance, the system(s) may use the architecture to process sensor data generated using one or more ultrasonic sensors and, based at least on the processing, generate input data. The system(s) may then use the machine learning model(s) to process the input data in order to generate one or more of the outputs described herein. Additionally, the system(s) may use the output(s) to determine the operation(s), such as a trajectory for a machine to navigate. For instance, the system(s) may then cause the machine to navigate according to the trajectory such that the machine does not collide with any objects located within the environment.

It should be noted that, while the examples here describe performing these processes using sensor data generated using the ultrasonic sensor(s), in other examples, similar processes may be performed using sensor data generated using one or more other types of sensors. For example, similar processes may be performed using sensor data generated using one or more image sensors, one or more LiDAR sensors, one or more RADAR sensors, and/or any other type of sensor.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems implementing one or more visual language models (VLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of augmenting ultrasonic data in order to perform one or more processes, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1100 of FIGS. 11A-11D, example computing device 1200 of FIG. 12, and/or example data center 1300 of FIG. 13.

The process 100 may include obtaining sensor data 102 generated one or more ultrasonic sensors of one or more machines (e.g., one or more of the autonomous vehicles 1100). As described herein, in some examples, the sensor data 102 may represent histograms indicating the distances to, reflection characteristics of, etc. objects and/or features located within the environment. For example, a histogram may be associated with a number of bins (e.g., 50 bins, 100 bins, 200 bins, 300 bins, 320 bins, 400 bins, etc.), where each bin is associated with a respective distance within the environment. Additionally, the histogram may indicate amplitudes associated with a frequency signal, where one or more peak amplitudes associated with the frequency signal may indicate one or more locations of one or more objects within the environment.

Additionally, in some examples, the process 100 may include receiving parameter data 104 representing information associated with the ultrasonic sensor(s). As described herein, the information may include, but is not limited to, one or more extrinsic parameters (e.g., the location(s), the orientation(s), etc.), one or more intrinsic parameters (e.g., frequency, etc.), one or more identifiers, one or more fields-of-view (FOV(s)), one or more modes (e.g., the firing model(s)), one or more reverberation timings, one or more temperatures, and/or any other information associated with the ultrasonic sensor(s).

The process 100 may then include processing the sensor data 102 using one or more processing paths. For instance, and as shown, a first path (represented by the lower path) may include not performing any type of additional processing to the sensor data 102, as compared to the other paths. In some examples, the sensor data 102 may represent one or more tensors that include a given shape. For example, the tensor(s) may include a shape such as B*960, 1,320, where this shape is based at least on the sensor data 102 being associated with 960 envelopes, 1 channel, and 320 bins. However, in other examples, the tensor(s) may include any other shape based on the sensor data 102 being associated with any other number of envelopes, any other number of channels, and/or any other number of bins.

Additionally, for a second path (represented by the middle path), one or more neural networks 106 (e.g., a 1D convolution, a 2D convolution, etc.) may process the sensor data 102 and, based at least on the processing, generate output data 108. As described herein, in some examples, the output data 108 may also represent one or more tensors of a given shape. For example, the tensor(s) may include a shape such as B*960,4,320, where the shape is based at least on the output data 108 being associated with 960 envelopes, 4 channel, and 320 bins. However, in other examples, the tensor(s) may include any other shape based on the output data 108 being associated with any other number of envelopes, any other number of channels, and/or any other number of bins. Additionally, in some examples, the increase in the number of channels, as compared to the sensor data 102, may allow for additional information to be input for one or more (e.g., each) of the bins.

Furthermore, for a third path (represented by the top path), an augmentation component 110 may receive the sensor data 102 and/or the parameter data 104. The augmentation component 110 may then use at least a portion of the parameter data 104 to augment the sensor data 102. For instance, the augmentation component 110 may add information to one or more (e.g., each) of the bins of one or more of the histograms represented by the sensor data 102. As described herein, in some examples, at least a portion of the information may be associated with the ultrasonic sensor(s) such as, but not limited to, one or more of the extrinsic parameter(s) (e.g., the location(s), the orientation(s), etc.), one or more of the intrinsic parameter, one or more of the identifier(s), an indication of one or more of the FOV(s), an indication of the mode(s), an indication of the reverberation timing(s), an indication of the temperature(s), and/or the like. Additionally, or alternatively, in some examples, at least a portion of the information may be associated with the sensor data 102 such as, but not limited to, an indication of one or more bin locations associated with one or more median peak amplitude values associated with one or more sliding windows, an indication of one or more bin locations associated with one or more peak amplitude values associated with the sliding window(s), an indication of one or more distances associated with one or more bins, an indication of one or more running variance amplitude values associated with one or more bins, an indication of one or more running mean amplitude values associated with one or more bins, and/or any other information.

Figure 2:
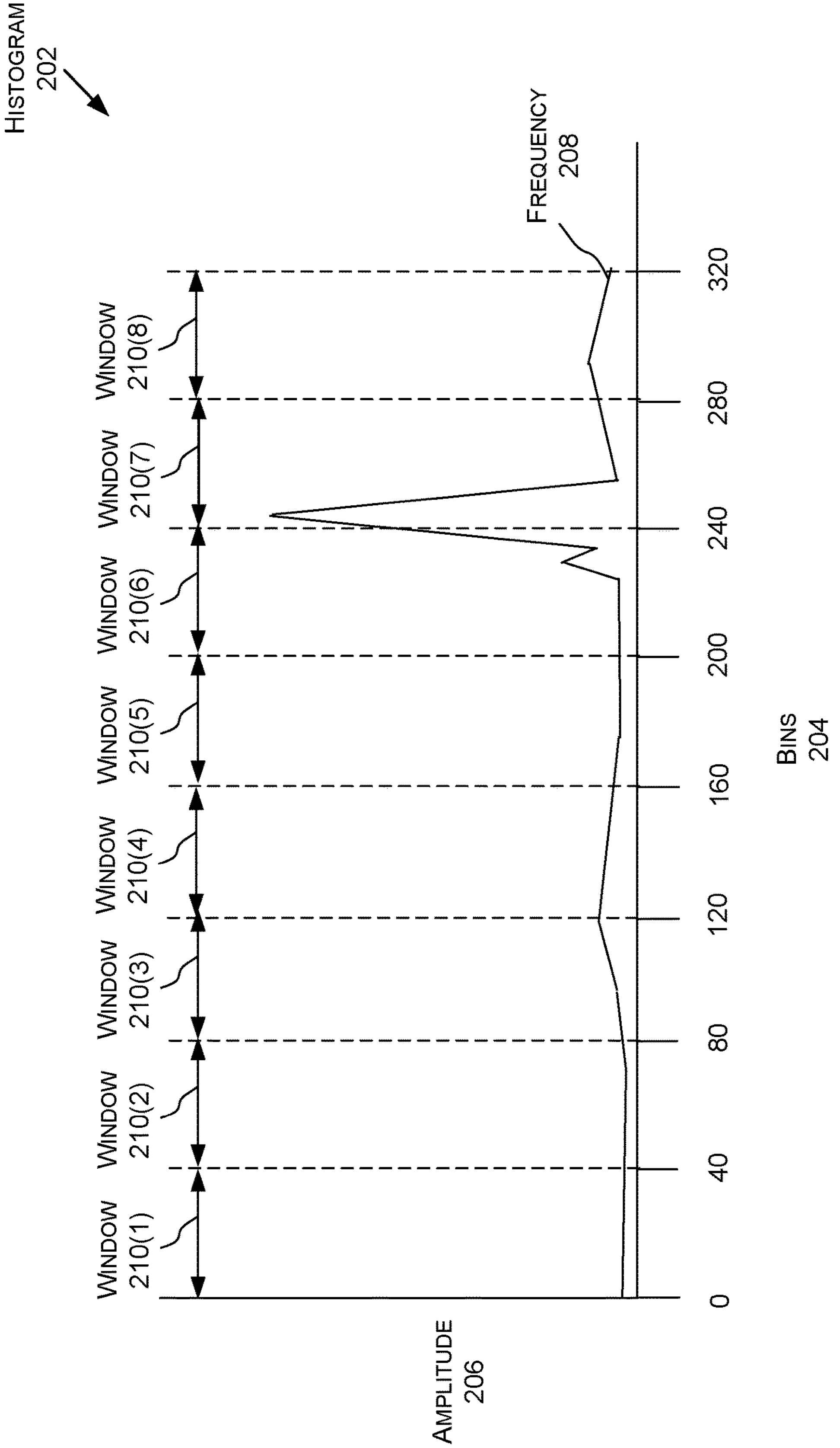
FIG. 2 illustrates an example of information that may be used to augment sensor data generated using one or more ultrasonic sensors, in accordance with some embodiments of the present disclosure.

For instance, FIG. 2 illustrates an example of information that may be used to augment sensor data generated using one or more ultrasonic sensors, in accordance with some embodiments of the present disclosure. As shown, the sensor data (e.g., the sensor data 102) may represent a histogram 202 that is associated with a number of bins 204. While the example of FIG. 2 illustrates the histogram 202 as including 320 bins, in other examples, the histogram 202 may be associated with any number of bins. Additionally, each bin 204 may be associated with a specific distance, such as 0.1 meters, 0.5 meters, 1 meter, 2 meters, and/or any other distance. As further shown, the histogram 202 further indicates amplitude values 206 for a frequency 208 over a distance associated with the bins 204. In some examples, and as described in more detail herein, the histogram 202 may be used to identify one or more locations of one or more objects, such as based on one or more peaks associated with the frequency 208.

The augmentation component 110 may then analyze the histogram 202 to determine information for augmenting the sensor data. For instance, in some examples, the augmentation component 112 may augment the sensor data by adding information indicating one or more distances (e.g., each distance) associated with one or more of the bins 204 (e.g., each bin 204). For example, if each bin represents a distance of 2 meters, then the augmentation component 110 may add information to the first bin 204 that indicates 2 meters, information to the second bin 204 that indicates 4 meters, information to the third bin 204 that indicates 6 meters, and/or so forth.

Additionally, or alternatively, in some examples, and for a bin 204, the augmentation component 110 may process histograms 202 over a period of time to determine amplitude values 206 associated with the frequencies 208 for the bin 204 over the period of time. The augmentation component 110 may then augment the sensor data by adding information associated with the bin 204, where the information indicates at least one of a running variance associated with the amplitude values 206 and/or a running mean associated with the amplitude values 206. Additionally, the augmentation component 110 may perform similar processes to add similar information for one or more additional bins 204 (e.g., each of the bins 204).

Additionally, or alternatively, in some examples, the augmentation component 110 may use one or more sliding windows 210(1)-(8) (also referred to singularly as "sliding window 210" or in plural as "sliding windows 210") to determine information associated with the sensor data. While the example of FIG. 2 illustrates eight sliding windows with a width of forty bins 204, in other examples, the augmentation component 110 may use any number of sliding windows that include any other width (e.g., 10 bins, 20 bins 30 bins, 50 bins, etc.).

For instance, in some examples, to use a sliding window 210, the augmentation component 110 may analyze the frequency 208 associated with the sliding window 210 to determine a specific bin 204 within the sliding window 210 that is associated with a maximum amplitude value 206 for the sliding window 210. For another bin 204 within the sliding window 210, the augmentation component 110 may then determine a distance between the bin and the specific bin. For a first example, and using the sliding window 210(7), if bin 204 number 244 is associated with the maximum amplitude value 206, then the augmentation component 110 may determine a first distance of 4 for bin 204 number 240. For a second example, and again using the sliding window 210(7), if bin 204 number 244 is again associated with the maximum amplitude value 206, then the augmentation component 110 may determine a second distance of −4 for bin 204 number 248. In either example, the augmentation component 110 may then add information indicating the distance to the bin 204. Additionally, the augmentation component 110 may perform similar processes for one or more (e.g., each) of the other bins 204 included in the sliding window 210 and/or one or more (e.g., each) of the other bins 204 included in one or more (e.g., each) of the other sliding windows 210.

Additionally, or alternatively, in some examples, to use a sliding window 210, the augmentation component 110 may analyze the frequency 208 associated with the sliding window 210 to determine a specific bin 204 within the sliding window 210 that is associated with a median amplitude value 206 for the sliding window 210. For another bin 204 within the sliding window 210, the augmentation component 110 may then determine a distance between the bin and the specific bin. For a first example, and using the sliding window 210(7), if bin 204 number 250 is associated with the median amplitude value 206, then the augmentation component 110 may determine a first distance of 10 for bin 204 number 240. For a second example, and again using the sliding window 210(7), if bin 204 number 250 is again associated with the median amplitude value 206, then the augmentation component 110 may determine a second distance of −10 for bin 204 number 260. In either example, the augmentation component 110 may then add information indicating the distance to the bin. Additionally, the augmentation component 110 may perform similar processes for one or more (e.g., each) of the other bins 204 included in the sliding window 210 and/or one or more (e.g., each) of the other bins 204 included in one or more (e.g., each) of the other sliding windows 210.

Referring back to the example of FIG. 1, based at least on the augmentation component 110 augmenting sensor data 102, the augmentation component 110 may output augmented sensor data 112. As described herein, in some examples, the augmented sensor data 112 may also represent one or more tensors of a given shape. For example, the tensor(s) may include a shape such as B*960,16,320, wherein the shape is based at least on the augmented sensor data 112 being associated with 960 envelopes, 16 channel, and 320 bins. However, in other examples, the tensor(s) may include any other shape based on the augmented sensor data 112 being associated with any other number of envelopes, any other number of channels, and/or any other number of bins. Additionally, in some examples, the increase in the number of channels, as compared to the sensor data 102, may allow for additional information to be input for one or more (e.g., each) of the bins (e.g., the augmented information)

The third path may further include one or more neural networks 114 (e.g., a 1D convolution, a 2D convolution, etc.) processing the augmented sensor data 112 and, based at least on the processing, generating output data 116. As described herein, in some examples, the output data 116 may also represent one or more tensors of a given shape. For example, the tensor(s) may include a shape such as B*960, 4,320, wherein the shape is based at least on the output data 116 being associated with 960 envelopes, 4 channel, and 320 bins. However, in other examples, the tensor(s) may include any other shape based on the output data 116 being associated with any other number of envelopes, any other number of channels, and/or any other number of bins. Additionally, in some examples, the increase in the number of channels, as compared to the sensor data 102, may allow for additional information to be input for one or more (e.g., each) of the bins.

The process 100 may then include an association component 118 receiving the sensor data 102, the output data 108, and/or the output data 116. In some examples, the process 100 may then include the association component 118 associating instances of the data together to generate output data 120. For example, and for sensor data 102 representing a histogram, the association component 118 may combine, concatenate, and/or perform any other technique to associate the sensor data 102 with the output data 108 that is associated with the same histogram and/or the output data 116 that is associated with the same histogram. In such examples, the output data 120 may also represent one or more vectors and/or tensors of a given shape. For example, the vector(s) and/or tensor(s) may include a shape such as B*960,9,320, wherein the shape is based at least on the output data 120 being associated with 960 envelopes, 9 channel, and 320 bins. However, in other examples, the tensor(s) may include any other shape based on the output data 120 being associated with any other number of envelopes, any other number of channels, and/or any other number of bins. Additionally, in some examples, the increase in the number of channels, as compared to the sensor data 102, may allow for additional information to be input for one or more (e.g., each) of the bins.

The process 100 may then include a projection component 122 processing the output data 120 and, based at least on the processing, generating input data 124 associated with one or more machine learning models 126. As described herein, an instance (e.g., a frame) of the input data 124 may represent one or more locations of one or more objects with respect to a machine within the environment. For instance, the input data 124 may represent an image (e.g., a top-down image, a BEV image, etc.), a map (e.g., a top-down map, a BEV map, etc.), an envelope, a projection (e.g., a range image), and/or any other type of representation that indicates the location(s) of the object(s) relative to the machine. In some examples, the projection component 122 may process every frame of the output data 120, every other frame of the output data 120, every fourth frame of the output data 120, every fifteenth frame of the output data 120, every thirtieth frame of the output data 120, and/or any other frame interval when generating the input data 124.

In some examples, a respective channel (e.g., each channel) of the tensor(s) represented by the output data 120 may produce a given number of representations, such as one representation, four representations, ten representations, and/or any other number. For example, if the number of channels in the tensor(s) is nine and each channel produces four representations, then a total of thirty-six channels may be represented by the input data 124.

Figure 3A:
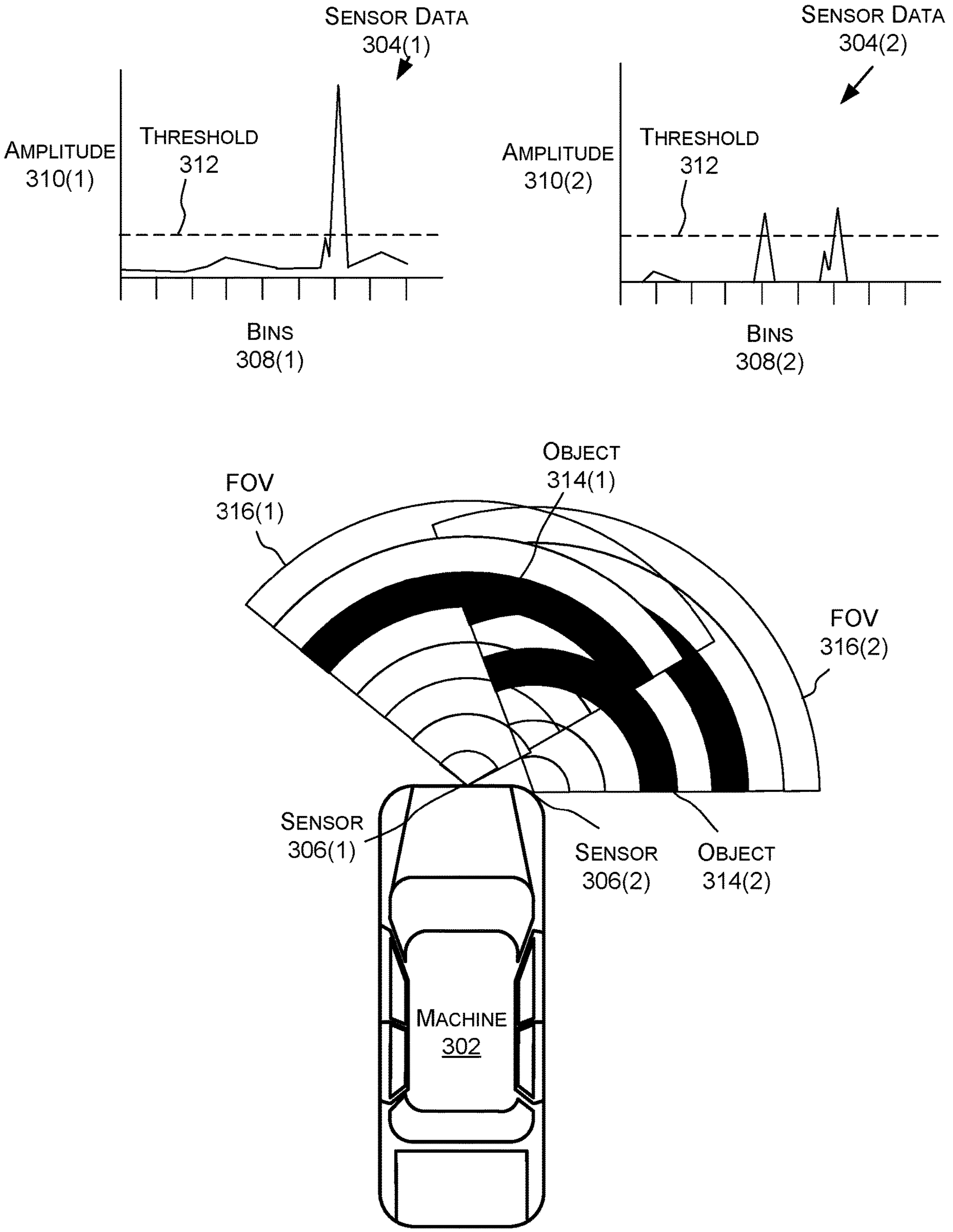
FIGS. 3A-3B illustrate an example of processing sensor data in order to generate input data, in accordance with some embodiments of the present disclosure.
Figure 3B:

For instance, FIGS. 3A-3B illustrate an example of processing sensor data in order to generate input data, in accordance with some embodiments of the present disclosure. The example of FIGS. 3A-3B may be associated with processing a specific type of data, such as the sensor data 102, the output data 108, and/or the output data 116. For instance, in the example of FIG. 3A, a machine 302 may generate first sensor data 304(1) using a first sensor 306(1) and second sensor data 304(2) using a second sensor 306(2). As shown, the sensor data 304(1)-(2) (also referred to generally as "sensor data 304") may represent a frequency of one or more signals at various distances, where the distances are associated with bins 308(1)-(2) (also referred to singularly as "bin 308" or in plural as "bins 308").

The projection component 122 may process the sensor data 304 to determine one or more distances to one or more objects located within the environment for which the machine 302 is located. To determine a distance to an object, the projection component 122 may use amplitude values 310(1)-(2) (also referred to singularly as "amplitude 310" or in plural as "amplitudes 310") associated with the frequencies. For example, the projection component 122 may determine that an object is associated with a bin 308 based on the amplitude value 310 satisfying (e.g., being equal to or greater than) a threshold amplitude 312. For instance, and in the example of FIG. 3A, the projection component 122 may determine that there is a first object 314(1) associated with a bin 308(1). Additionally, the projection component 122 may determine that there is the first object 314(1) associated a bin 308(2) and a second object 314(2) associated with another bin 308(2).

The projection component 122 may then determine the locations of the objects 314(1)-(2) within the environment based at least on FOVs 316(1)-(2) (or sensory fields) of the sensors 306(1)-(2) and the determined distances. For instance, and as discussed herein, each bin 308 may be associated with a specific distance from the sensor 306. For example, and as shown, a first bin 204(1) may be associated with a first distance represented by the first arc of the FOV 316(1), a second bin 308(1) may be associated with a second distance represented by the second arc of the FOV 316(1), a third bin 308(1) may be associated with a third distance represented by the third arc of the FOV 316(1), and/or so forth. As such, the projection component 122 may determine that the first object 314(1) is located within an area of the environment represented by a sixth arc of the FOV 316(1), which is indicated by the shading.

The projection component 122 may then use similar processes to determine the locations of the objects using the sensor data 304(2). For instance, the projection component 122 may determine that the first object 314(1) is located within an area of the environment represented by a sixth arc of the FOV 316(2), which is also indicated by shading. Additionally, the projection component 122 may determine that the second object 314(2) is located within an area of the environment represented by a fourth arc of the FOV 316(2), which is also indicated by shading. The projection component 122 may then perform similar processes for one or more additional sensors (e.g., each sensor that generates the type of sensor data 304) of the machine 302, which is not illustrated for clarity reasons.

As illustrated in the example of FIG. 3B, the projection component 122 may then generate input data 318 (which may represent, and/or include, the input data 124) based at least on the object locations determined using the example of FIG. 3A. As described herein, the input data 318 may represent an image (e.g., a top-down image, a BEV image, etc.), a map (e.g., a top-down map, a BEV map, etc.), an envelope, a projection, and/or the like. As shown, the input data 318 may represent areas 320 within the environment that are outside of the FOVs 316 of the sensors 306 that generated the sensor data 304, where the areas 320 are represented by dark shading in the example of FIG. 3B. In some examples, the areas 320 include the area of the machine 302 itself within the environment (e.g., the machine 302 is outside of the FOVs 316 of the sensors 306). The input data 318 may also represent areas 322 within the environment that are within the FOVs 316 of the sensors 306 that generated the sensor data 304, where the areas 322 are represented by white shading in the example of FIG. 3B. Furthermore, the input data 318 may represent areas 324 (although only one is labeled for clarity reasons) for which objects may be located within the environment, where the areas 324 are represented by light shading. While the example of FIG. 3B uses dark shading for the areas 320, white shading for the areas 322, and light shading for the areas 324, in other examples, the input data 318 may include any other type of shading, color, shape, pattern, indicator, and/or the like to represent or provide a visualization of one or more of the areas 320-324.

As described herein, in some examples, the projection component 122 may perform similar processes to continue processing the sensor data 304 in order to generate the input data 318. For instance, the projection component 122 may generate the input data 318 for every frame represented by the sensor data 304, every other frame represented by the sensor data 304, every fourth frame represented by the sensor data 304, every fifteenth frame represented by the sensor data 304, every thirtieth frame represented by the sensor data 304, and/or any other interval associated with the frames. Additionally, in some examples, the projection component 122 may generate multiple iterations of input data 318 for each frame represented by the sensor data 304.

Referring back to the example of FIG. 1, while the example of FIG. 1 describes the augmentation component 110 augmenting the sensor data 102 using the information, in other examples, the augmentation component 110 may additionally and/or alternatively augment the input data 124 using the information. For example, the augmentation component 110 may add the information to one or more channels associated with the input data 124.

Figure 4:
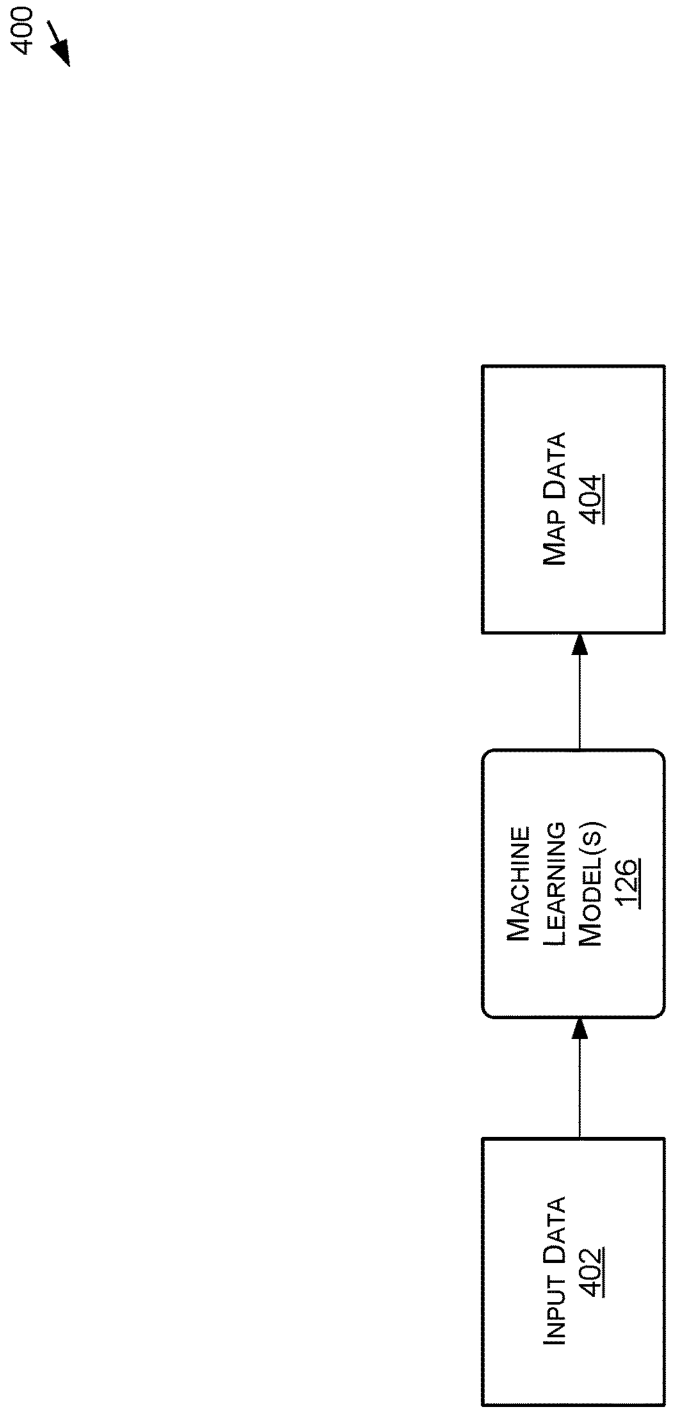
FIG. 4 illustrates an example data flow diagram for a process of using one or more machine learning models to determine information associated with an environment, in accordance with some embodiments of the present disclosure.

As described herein, in some examples, the input data 124 may be used by the machine learning model(s) 126 for various purposes. For example, such as if the machine learning model(s) 126 is being used by a machine to navigate, then the machine learning model(s) 126 may use the input data 124 to determine locations of objects within an environment for which the machine is navigating. For instance, FIG. 4 illustrates an example data flow diagram for a process of using one or more machine learning models to determine information associated with an environment, in accordance with some embodiments of the present disclosure.

As shown, the process 400 may include inputting input data 402 into the machine learning model(s) 126, wherein the input data 402 may represent and/or include at least a portion of the input data 124. The machine learning model(s) 126 may then process the input data 402 and, based at least on the processing, output map data 404 (and/or data used to update a map and/or other representation associated with the environment) associated with an environment. As described herein, the map data 404 may include, but is not limited to, a height map(s), an occupancy map(s), a height/occupancy map(s), a distance map(s), and/or the like. In some examples, one or more of the maps may include a BEV map, a top-down map, and/or the like. In some examples, the machine learning model(s) 126 may be trained to output a single map, such as a single occupancy map, a single height map, a single height/occupancy map, or a single distance map. In some examples, the machine learning model(s) 126 may be trained to output multiple maps and/or other output representations. For a first example, the machine learning model(s) 126 may be trained to output a height map and an occupancy map. For a second example, the machine learning model(s) 126 may be trained to output multiple height maps, such as a first height map associated with a first portion of the input data 402, a second height map associated with a second portion of the input data 402, and/or so forth.

Figure 5A:
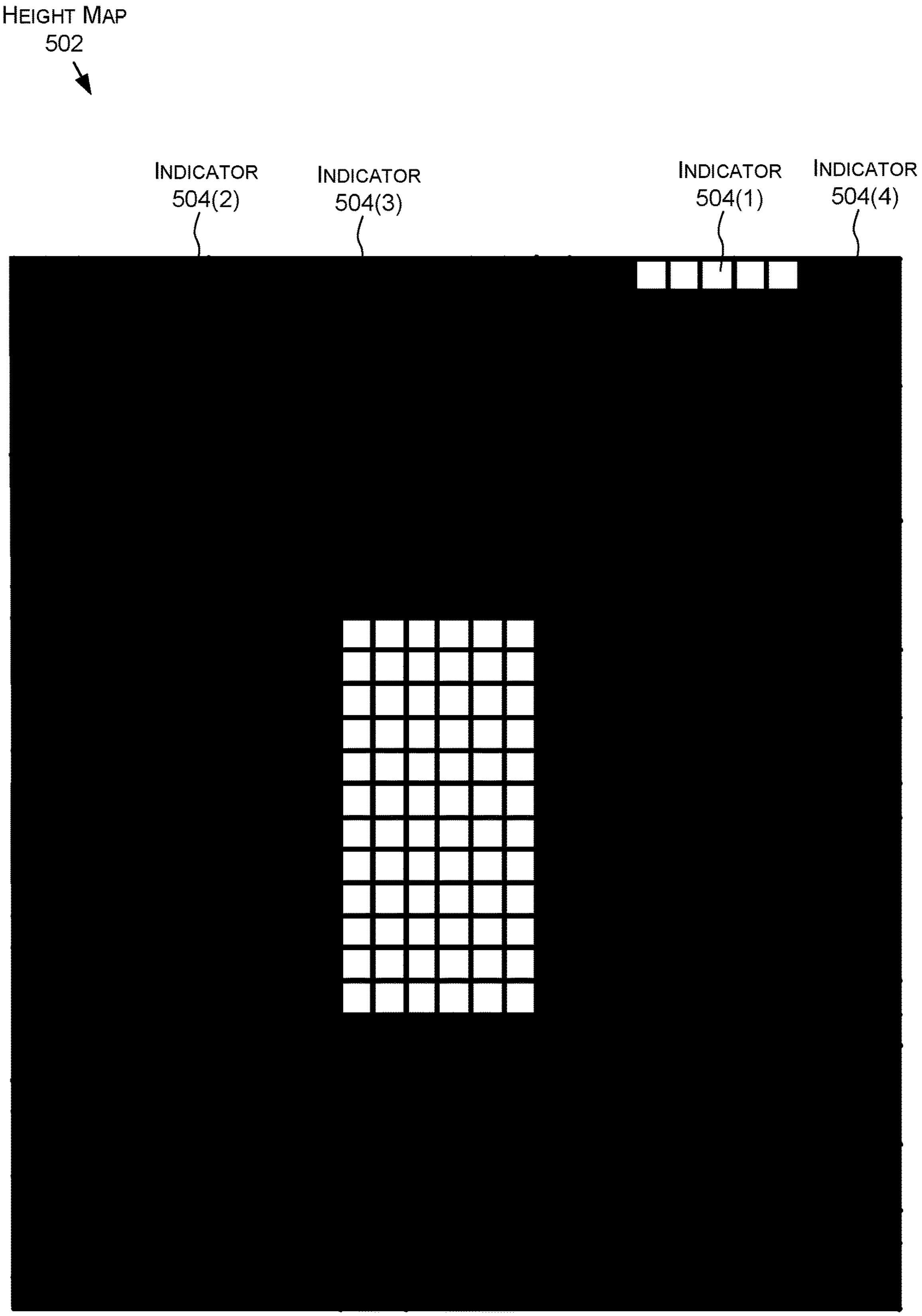
FIGS. 5A-5C illustrate example maps generated by one or more machine learning models, in accordance with some embodiments of the present disclosure.

For instance, FIG. 5A illustrates an example of a height map 502, in accordance with some examples of the present disclosure. As shown, the height map 502 may include various indicators 504(1)-(4) (also referred to singularly as "indicator 504" or in plural as "indicators 504") (although only one area is labeled for each type of indicator 504 for clarity reasons) that indicate the various heights of the environment surrounding the machine and/or areas within the environment for which the machine is uncertain of the height. While the example of FIG. 5A illustrates the height map 502 as including four different colors of indicators 504, in other examples, the height map 502 may include any number of colors of indicators 504. Additionally, while the example of FIG. 5A illustrates using colors for the indicators 504, in other examples, the height map 502 may use other types of indicators 504, such as shading, patterns, shapes, and/or the like.

In the example of FIG. 5A, the first indicators 504(1) of the height map 502 may indicate areas of the environment for which the machine is uncertain of the height. For instance, and as shown, the machine may be uncertain about the center of the height map 502 since the center of the height map 502 represents the location of the machine. As such, the sensor(s) of the machine may be less capable of generating sensor data representing that area of the environment and/or the machine learning model(s) 126 may generate the height map 502 to automatically cause that area to include an uncertain height. The machine may also be uncertain about other areas of the environment for which the sensor data 102 does not represent (e.g., the areas may be blocked by other objects). The second indicators 504(2) of the height map 502 may then indicate areas of the environment that include a first height, the third indicators 504(3) of the height map 502 may indicate areas of the environment that include a second height that is greater than the first height, and the fourth indicator 504(4) of the height map 502 may indicate areas of the environment that include a third height that is greater than the second height.

In the example of FIG. 5A, each square of the height map 502 may include a pixel or point representing an area of the environment. For example, the height map 502 may indicate the respective height of one or more pixels or points (e.g., each pixel or point). However, in other examples, each square of the height map 502 may include multiple pixels or points (e.g., points-x, y coordinates—in 3D space) representing an area of the environment. Additionally, in some examples, the height map 502 may include confidences associated with the heights. For example, and for a pixel or point, the height map 502 may indicate both the height associated with the pixel or point and the confidence associated with the height. For example, the height and/or confidence may be encoded to the pixel values for the pixels or points, and the location of the pixels or points may indicate lateral and longitudinal locations in 3D space, so the resulting map or grid represents 3D information about the environment.

Figure 5B:
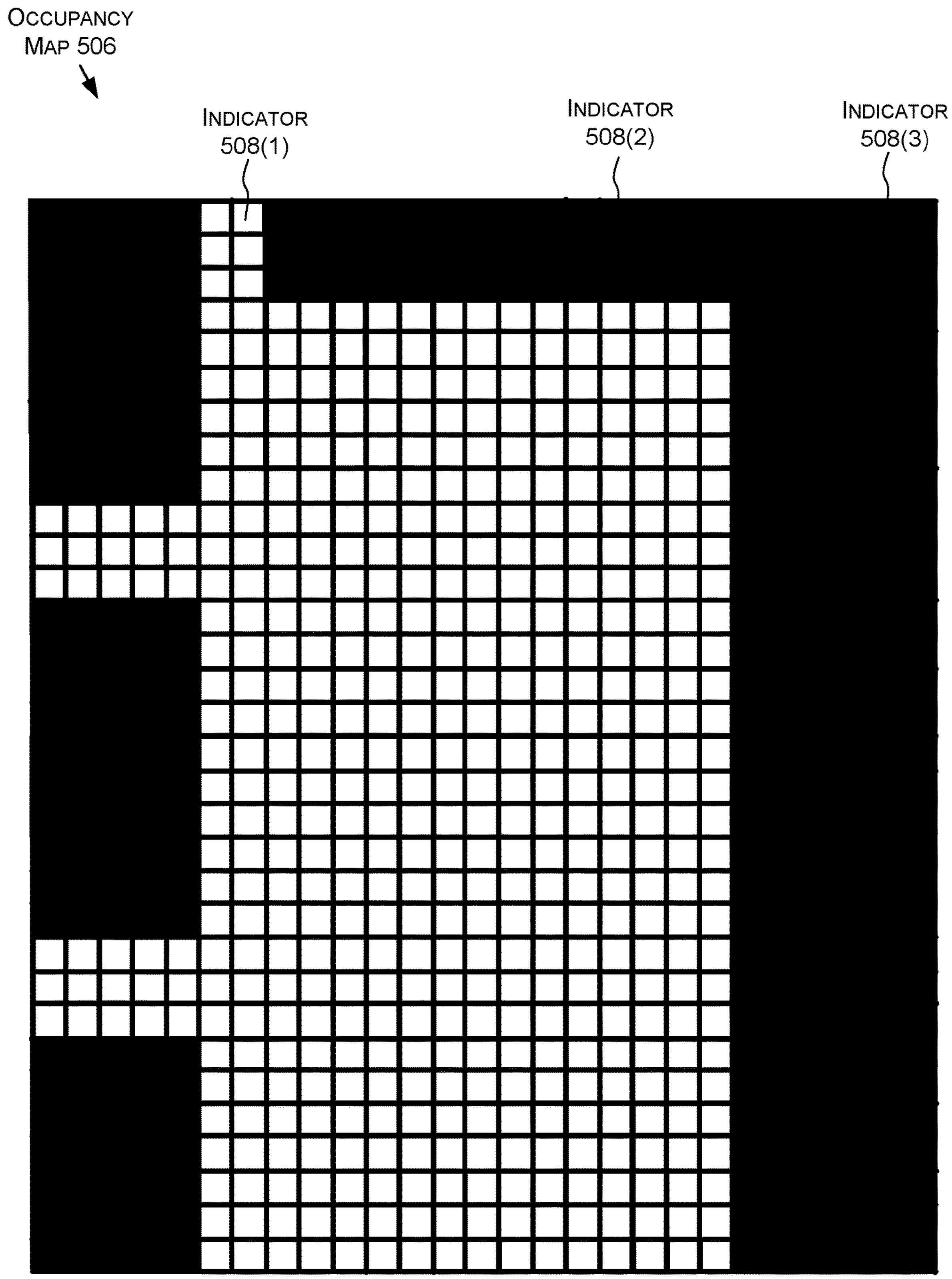

FIG. 5B illustrates an example of an occupancy map 506, in accordance with some examples of the present disclosure. As shown, the occupancy map 506 may include various indicators 508(1)-(3) (also referred to singularly as "indicator 508" or in plural as "indicators 508") (although only one area is labeled for each type of indicator 508 for clarity reasons) that indicate the various occupancies associated with the environment surrounding the machine and/or areas within the environment for which the machine is uncertain of the occupancy. While the example of FIG. 5B illustrates the occupancy map 506 as including three different colors of indicators 508, in other examples, the occupancy map 506 may include any number of colors of indicators 508. Additionally, while the example of FIG. 5B illustrates using colors for the indicators 508, in other examples, the occupancy map 506 may use other types of indicators 508, such as shading, patterns, shapes, and/or the like.

In the example of FIG. 5B, the first indicator 508(1) of the occupancy map 506 may indicate areas of the environment that are not occupied (e.g., areas of the environment for which the machine is free to navigate). The second indicator 508(2) of the occupancy map 506 may indicate areas of the environment that are occupied (e.g., areas of the environment for which the machine may not navigate). Additionally, the third indicator 508(3) of the occupancy map 506 may indicate areas of the environment for which the machine is uncertain about the occupancy.

In the example of FIG. 5B, each square of the occupancy map 506 may include a pixel representing an area of the environment. For example, the occupancy map 506 may indicate the respective occupancy associated with one or more pixels (e.g., each pixel). However, in other examples, each square of the occupancy map 506 may include multiple pixels representing an area of the environment. Additionally, in some examples, the occupancy map 506 may include confidences associated with the occupancies. For example, and for a pixel, the occupancy map 506 may indicate both the occupancy associated with the pixel and the confidence associated with the occupancy.

In the example of FIGS. 5B, the occupancy map 506 may correspond to the height map 502. For example, the areas of the height map 502 that include heights less than a threshold height and/or areas of the height map 502 that are associated with the location of the machine may correspond to the unoccupied areas of the occupancy map 506. For instance, the areas of the height map 502 that include the second indicator 504(2) may include heights that are less than the threshold height. Additionally, areas of the height map 502 that include heights that are equal to or greater than the threshold height may correspond to the occupied areas of the occupancy map 506. For instance, areas of the height map 502 that include the third indicator 504(3) and the fourth indicator 504(4) may include heights that are equal to or greater than the threshold height.

Figure 5C:
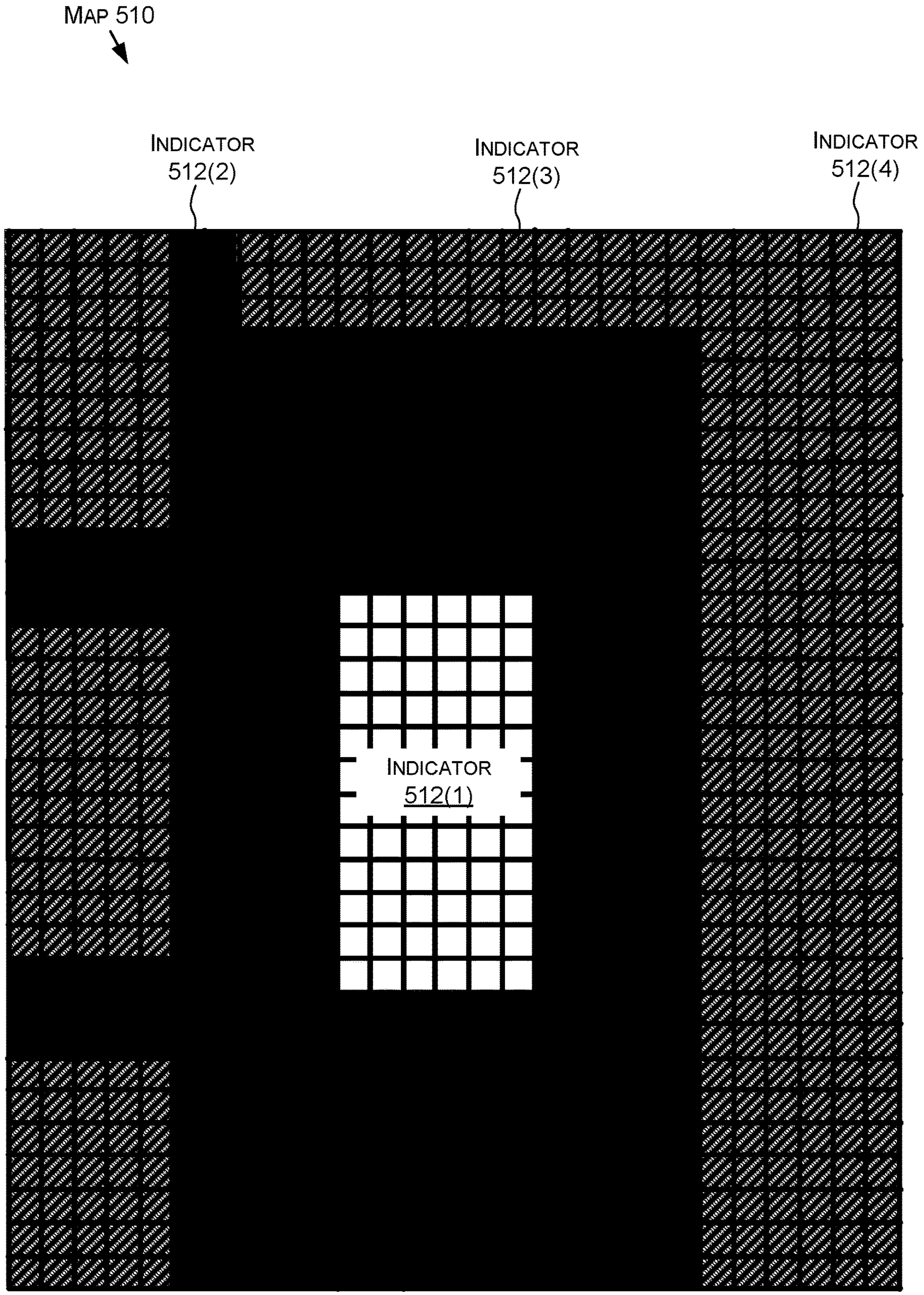

For instance, FIG. 5C illustrates an example of a height/occupancy map 510, in accordance with some examples of the present disclosure. As shown, the height/occupancy map 510 may include various indicators 512(1)-(4) (also referred to singularly as "indicator 512" or in plural as "indicators 512") (although only one area is labeled for each type of indicator 512 for clarity reasons) that indicate the various heights and/or occupancies of the environment surrounding the machine. While the example of FIG. 5C illustrates the height/occupancy map 510 as including four different of indicators 512, in other examples, the height/occupancy map 510 may include any number indicators 512. Additionally, while the example of FIG. 5B illustrates using colors and patterns for the indicators 512, in other examples, the height/occupancy map 510 may use other types of indicators 512.

In the example of FIG. 5C, the first indicators 512(1) of the height/occupancy map 510 may indicate areas of the environment for which the machine is uncertain of the height. For instance, and as shown, the machine may be uncertain about the center of the height/occupancy map 510 since the center of the height/occupancy map 510 represents the location of the machine. As such, the sensor(s) of the machine may be unable to generate sensor data representing that area of the environment and/or the machine learning model(s) 126 may generate the height/occupancy map 510 to automatically cause that area to include an uncertain height. The machine may also be uncertain about other areas of the environment for which the sensor data 102 does not represent (e.g., the areas may be blocked by other objects). The second indicators 512(2) of the height/occupancy map 510 may then indicate areas of the environment that include a first height, the third indicators 512(3) of the height/occupancy map 510 may indicate areas of the environment that include a second height that is greater than the first height, and the fourth indicator 512(4) of the height/occupancy map 510 may indicate areas of the environment that include a third height that is greater than the second height.

The indicators 512 of the height/occupancy map 510 may further indicate whether the areas of the environment are occupied or unoccupied. For instance, and as shown, the indicators 512(1)-(2) that include a first pattern (e.g., a solid pattern) may be unoccupied while the indicators 512(3)-(4) that include a second patter (e.g., a stripped pattern) may be occupied. As such, the height/occupancy map 510 indicates both the heights and the occupancies associated with the environment. As such, the height/occupancy map 510 indicates the same information from both the height map 502 and the occupancy map 506.

Figure 6:
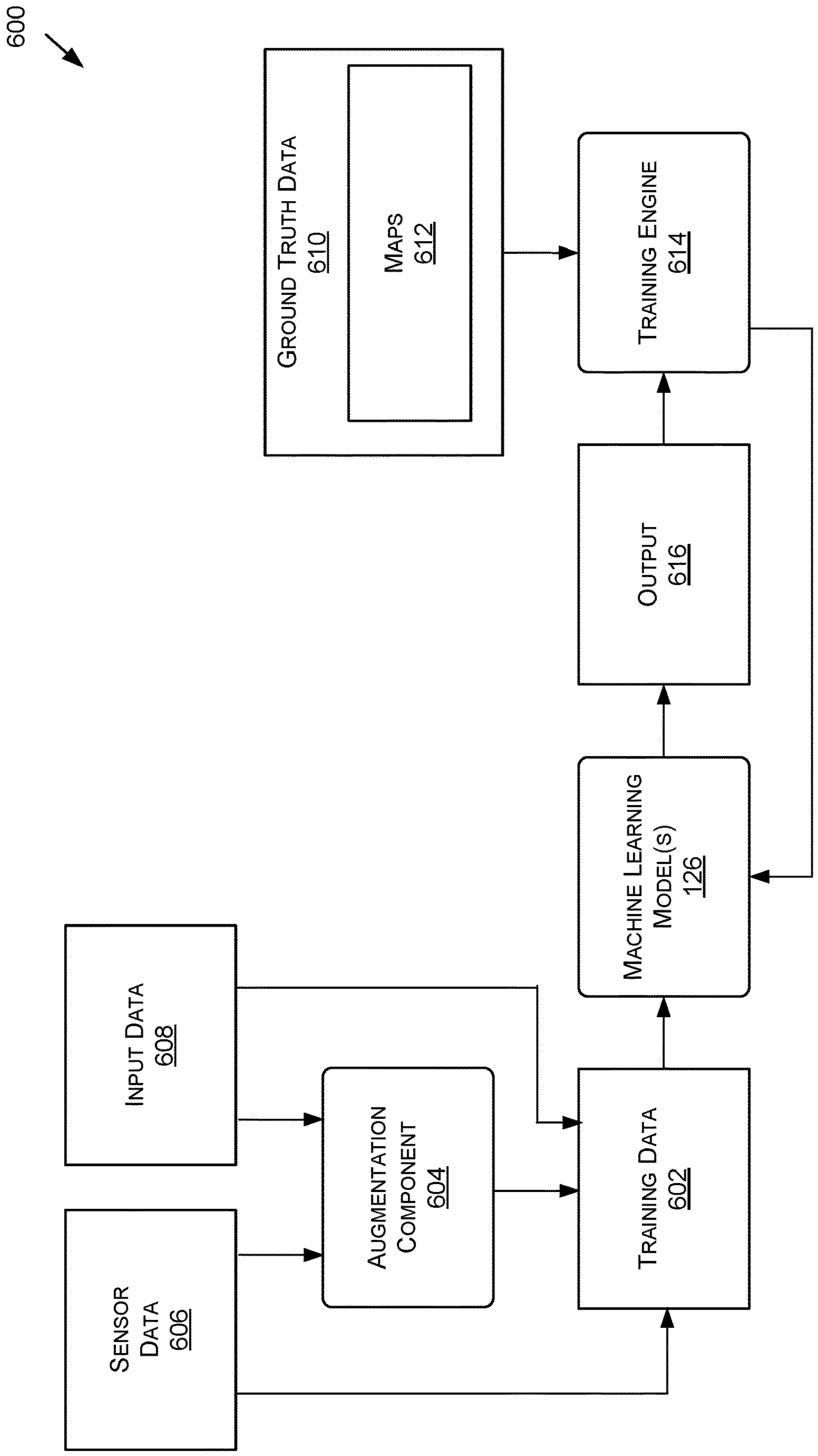
FIG. 6 illustrates a data flow diagram illustrating a process for training one or more machine learning models to generate information associated with environments, in accordance with some embodiments of the present disclosure.

As also described herein, the machine learning model(s) 126 may be trained such that the machine learning model(s) 126 is able to generate accurate map data. For instance, FIG. 6 is a data flow diagram illustrating a process 600 for training the machine learning model(s) 126, in accordance with some embodiments of the present disclosure. As shown, the machine learning model(s) 126 may be trained using training data 602. In some examples, the training data 602 may be similar to, and/or include, at least a portion of the sensor data 102 and/or at least a portion of the input data 124. Additionally, as described herein, in some examples, an augmentation component 604 may process sensor data 606 (which may represent, and/or be similar to, the sensor data 102) and/or input data 608 (which may be similar to, and/or include, the input data 124) using one or more augmentation techniques in order to generate at least a portion of the training data 602 (also referred to as "augmented training data 602").

Figure 7A:
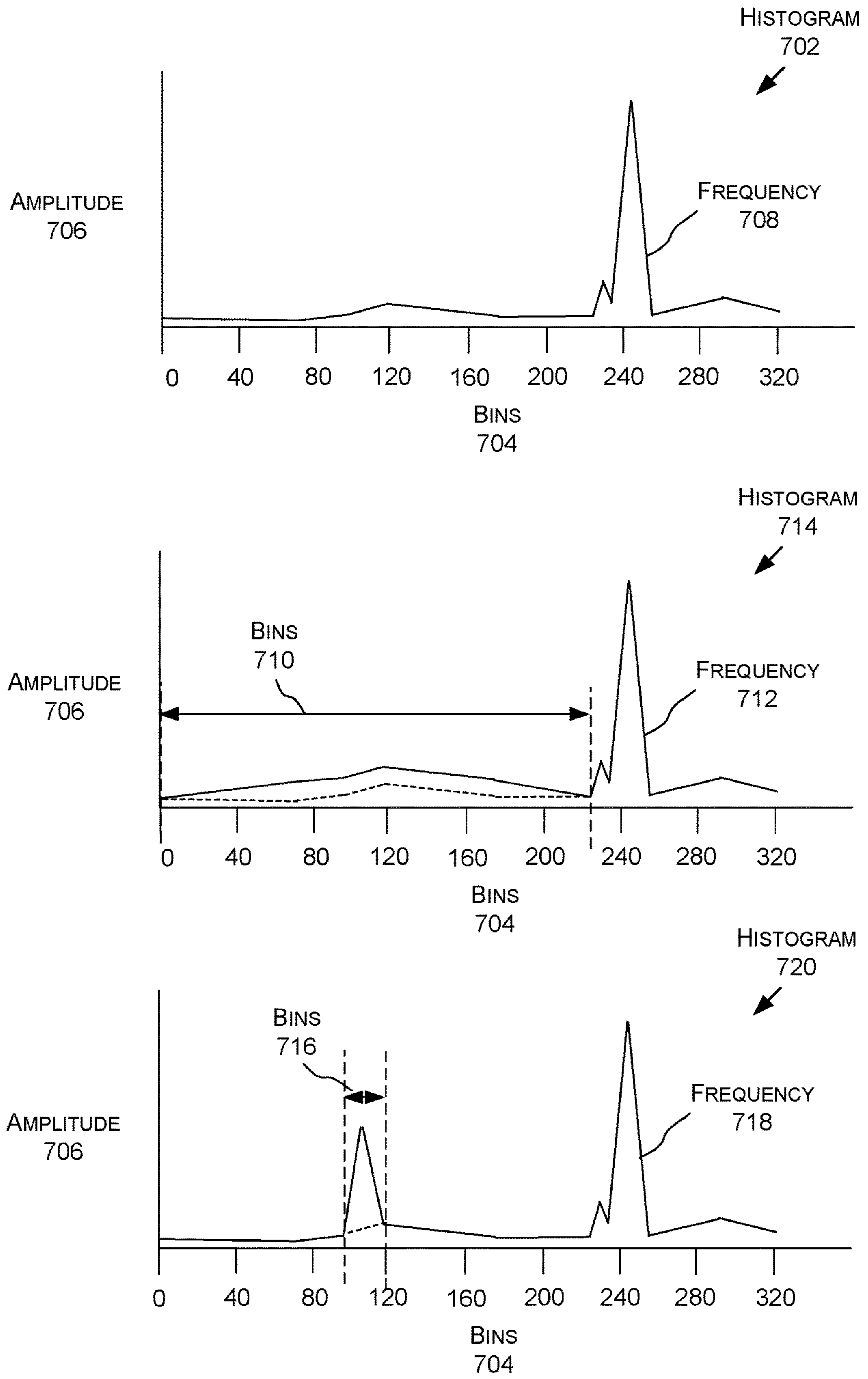
FIGS. 7A-7C illustrate examples of generating augmented training data, in accordance with some embodiments of the present disclosure.

For instance, FIG. 7A illustrates a first example of generating augmented training data 602, in accordance with some embodiments of the present disclosure. In some examples, the augmentation technique illustrated by the example of FIG. 7A may be associated simulating different types of driving surfaces, such as driving surfaces that include asphalt, brick, dirt, rocks, and/or any other type of driving surface, such as to reduce distribution bias associated with the machine learning model(s) 126. For instance, and as described herein, the sensor data 606 may represent a histogram 702 that is associated with a number of bins 704. While the example of FIG. 7A illustrates the histogram 702 as including 320 bins 704, in other examples, the histogram 702 may be associated with any number of bins. Additionally, each bin 704 may be associated with a specific distance, such as 0.1 meters, 0.5 meters, 1 meter, 2 meters, and/or any other distance. As further shown, the histogram 702 further indicates amplitude values 706 of a frequency 708 over a distance associated with the bins 704.

As such, the augmentation component 604 may add noise, gaussian blurring, and/or any other artifacts to the sensor data 606 to generate augmented sensor data, where the augmented sensor data may be represented by the augmented training data 602. In some examples, the augmentation component 604 may augment the sensor data 606 using various types of noise, such as low frequency noise and/or high frequency noise. For instance, with regard to high frequency noise and as illustrated by the middle illustration, the augmentation component 604 may add a first amount of noise (e.g., 0.05, 0.1, etc.) to a first number of bins 710 associated with the histogram 702 in order to generate a new frequency 712 associated with a new histogram 714 represented by the augmented sensor data. While the example of FIG. 7A illustrates the augmentation component 604 as adding the noise to a portion of the bins 704, such as the first 235 bins, in other examples, the augmentation component 604 may add the noise to additional and/or alternative bins.

Additionally, with regard to low frequency noise and as illustrated by the bottom illustration, the augmentation component 604 may add a second amount of noise (e.g., 0.4, 0.5, etc.) to a second number of bins 716 associated with the histogram 702 in order to generate a new frequency 718 associated with a new histogram 720 represented by the augmented sensor data. In some examples, the second amount of noise is greater than the first amount of noise and/or the second number of bins is less than the first number of bins. Additionally, while the example of FIG. 7A illustrates the augmentation component 604 as adding the noise to a portion of the bins 704, such as bins numbered 95 to 120, in other examples, the augmentation component 604 may add the noise to additional and/or alternative bins.

In some examples, the augmentation component 604 may perform similar processes to augment any number of instances of the sensor data 606 that represent any number of histograms. Additionally, in some examples, at least a portion of the augmented sensor data may be processed using at least a portion of the process 100 in order to generate augmented input data, where the augmented input data may also be represented by the augmented training data 602.

Figure 7B:
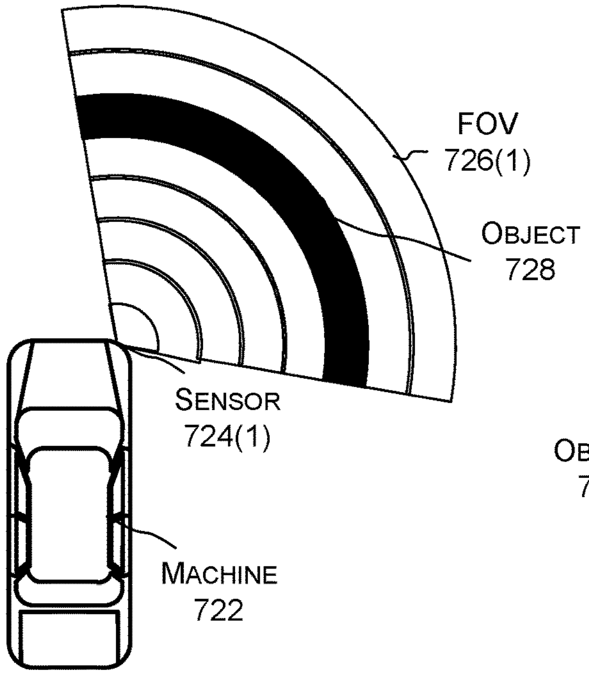
Figure 7B:
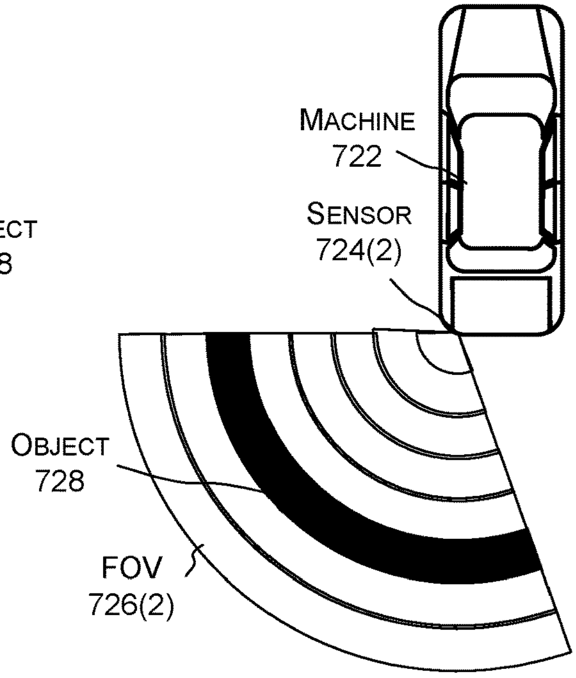
Figure 7B:
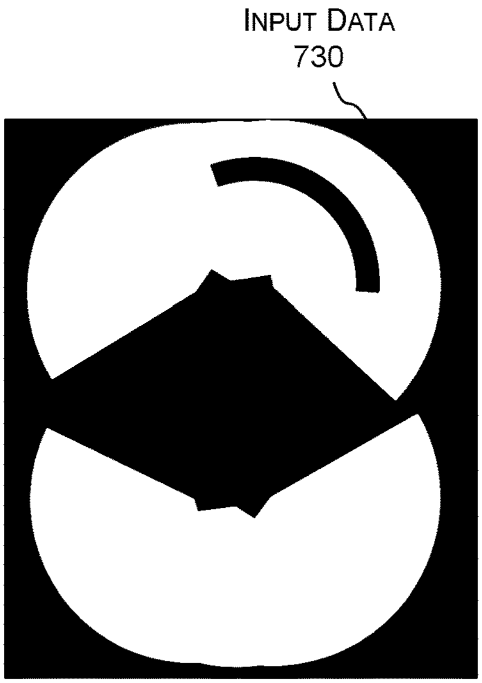
Figure 7B:
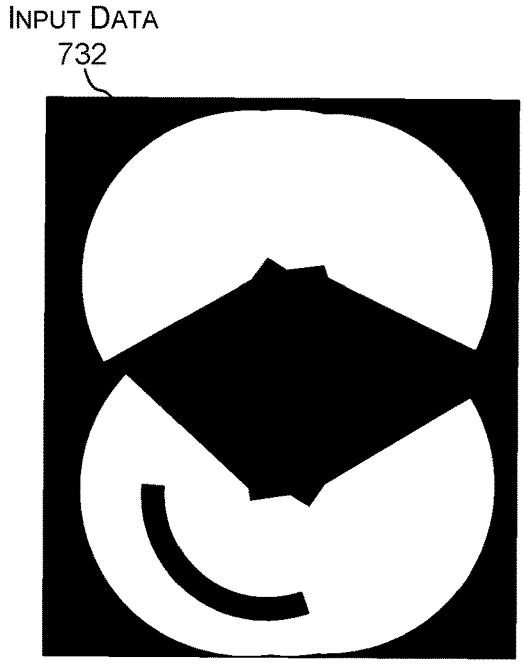

FIG. 7B illustrates a second example of generating augmented training data 602, in accordance with some embodiments of the present disclosure. In some examples, the augmentation technique illustrated by the example of FIG. 7B may be associated with simulating objects at different locations around machines, such as to reduce direction bias associated with the machine learning model(s) 126. For instance, a machine 722 may use a first sensor 724(1) to generate sensor data 606, where the first sensor 724(1) includes a first FOV 726(1). In the example of FIG. 7B, an object 728 may be located within the first FOV 726(1) and, as such, the sensor data 606 may represent the object 728. As such, by performing at least a portion of the process 100 of FIG. 1, input data 730 (which may represent, and/or include, the input data 124 and/or the input data 608) associated with the sensor data 606 may be generated.

The augmentation component 604 may then generate augmented training data 602 by rotating and/or flipping the sensor data 606 and/or the input data 730 such that the sensor data 606 is generated using a different sensor at a different pose on the machine 722. For instance, and in the example of FIG. 7B, the augmentation component 604 may rotate the sensor data 606 and/or the input data 730 such that the sensor data 606 was generated using a second sensor 724(2) that includes a second FOV 726(2). As described herein, the augmentation component 604 may use any technique to perform the augmentation, such as updating a projection matrix associated with the sensor data 606 to include a pose associated with the second sensor 724(2) and/or rotating the input data 608 by a given angle. Based at least on performing the augmentation, the augmentation component 604 may generate augmented input data 732 that may include at least a portion of the augmented training data 602. Additionally, the augmentation component 604 may perform similar processes to generate additional augmented training data 602, such as by causing the input data 730 to rotate at different angles and/or flip. Furthermore, the augmentation component 604 may perform similar process using any number of instances of the sensor data 606 to generate additional augmented training data 602.

Figure 7C:
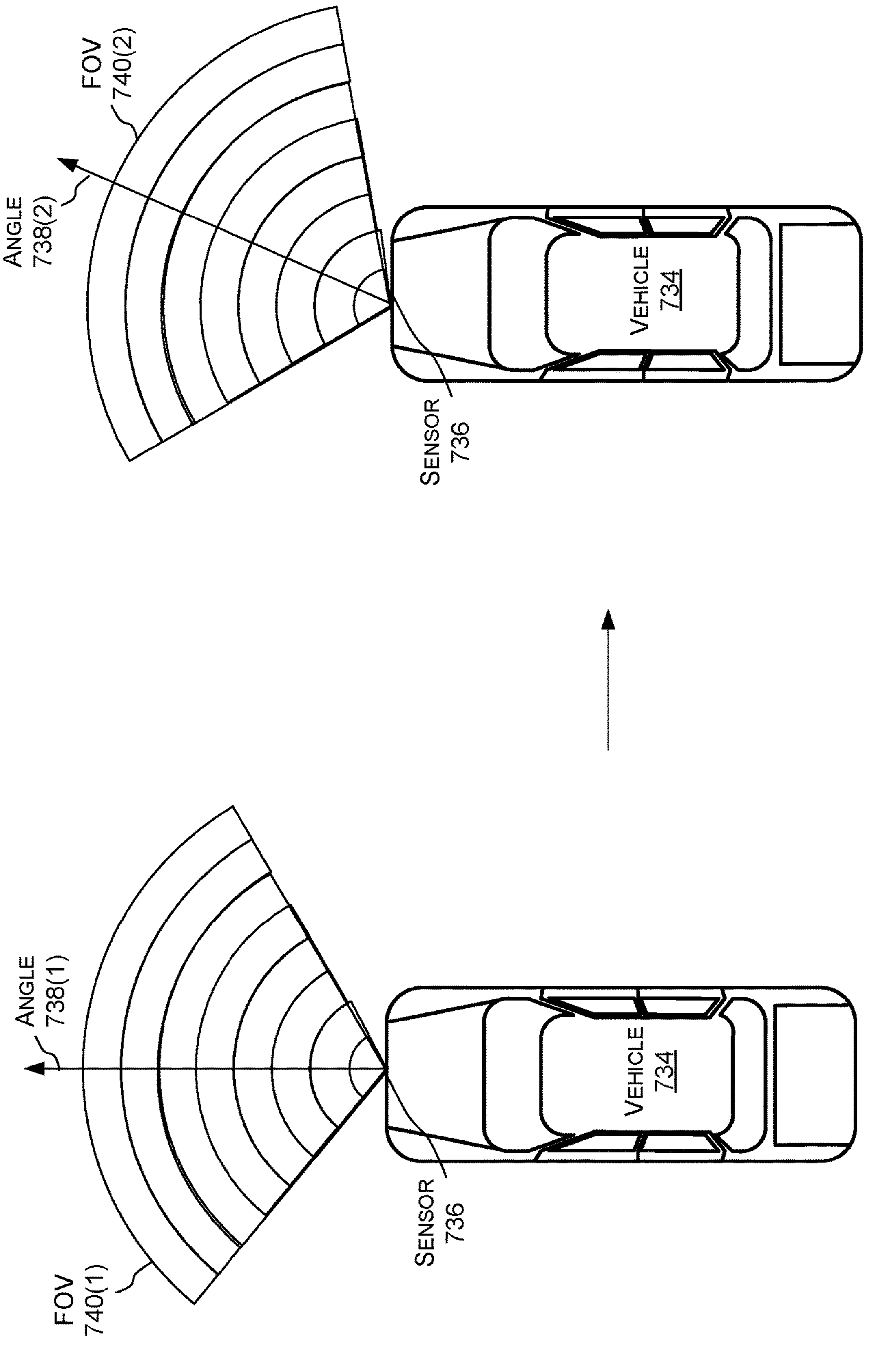

FIG. 7C illustrates a third example of generating augmented training data 602, in accordance with some embodiments of the present disclosure. In some examples, the augmentation technique illustrated by the example FIG. 7C may be associated with simulating sensors of machines that include different orientations (e.g., yaw angles) in order to reduce systematic value distortion bias associated with the machine learning model(s) 126. For instance, and as shown, a machine 734 may generate sensor data 606 using a sensor 736 that includes a first angle 738(1) (e.g., a first yaw angle) such that the sensor 736 further includes a first FOV 740(1). However, the augmentation component 604 may be configured to generate the augmented training data 602 based at least on simulating the sensor data 606 such that the sensor data 606 is generated by the sensor 736 (and/or another sensor) that includes a different orientation. For example, the augmentation component 604 may simulate the sensor 736 as including a second angle 738(1) (e.g., a second yaw angle) and, as such, a second FOV 740(2).

In some examples, the augmentation component 604 may use one or more techniques to perform the augmentation. For instance, the augmentation component 604 may update a projection matrix associated with the sensor 736 and/or the sensor data 606 such that the projection matrix indicates the second angle 738(2) (e.g., the simulated yaw angle). Additionally, in some examples, the augmentation component 604 may determine the second angle 738(2) based at least on one or more factors, such as one or more poses of one or more sensors associated with a target machine for which the machine learning model(s) 126 is being trained. For example, if the target machine for which the machine learning model(s) 126 is being trained includes a sensor with a yaw angle that is a set number of degrees (e.g., 2 degrees) different than the first angle 738(1) of the sensor 736, then the augmentation component 604 may determine the second angle 738(2) by updating the yaw angle by at least the set number of degrees (e.g., 4 degrees). Furthermore, in some examples, the augmentation component 604 may perform these processes to simulate varying angles associated with the sensor 736, such as by updating the yaw angle to include multiple different angles (e.g., 1 degree, 2 degrees, 4 degrees, etc.).

While the example of FIG. 7C illustrates updating the orientation of a single sensor 736 of the machine 734 that generated the sensor data 606, in other examples, the augmentation component 604 may perform similar processes to augment sensor data 606 generated using any number of sensors of the machine 734. In some examples, the augmentation component 604 may augment the sensor data 606 generate using all of the sensors while, in other examples, the augmentation component 604 may augment the sensor data 606 generated using one or more selected sensors. For example, the augmentation component 604 may augment the sensor data 606 generated using one or more sensors of the machine 734 that include at least a threshold angle difference from one or more corresponding sensors of a target machine, a threshold number of the sensors of the machine 734 that include a greatest angle difference from the sensors of the target machine, and/or using any other technique.

Referring back to the example of FIG. 6, the process 600 may include training the machine learning model(s) 126 using the training data 602 (e.g., the sensor data 606, the input data 608, and/or the augmented data) as well as corresponding ground truth data 610. The ground truth data 610 may include maps, annotations, labels, masks, and/or any other type of ground truth data. For instance, in some embodiments, the ground truth data 610 may represent maps 612 corresponding to the types of maps and/or other output representations for which the machine learning model(s) 126 is being trained to output. For a first example, if the machine learning model(s) 126 is being trained to generate height maps, then the maps 612 may include height maps. For a second example, if the machine learning model(s) 126 is being trained to generate occupancy maps, then the maps 612 may include occupancy maps. For a third example, if the machine learning model(s) 126 is being trained to generate height maps and occupancy maps, then the maps 612 may include both occupancy maps and height maps. Still, for a fourth example, if the machine learning model(s) 126 is being trained to generate height/occupancy maps, then the maps 612 may include height/occupancy maps.

The ground truth data 610 may be generated using one or more techniques. For a first example, the ground truth data 610 may be generated within a drawing program (e.g., an annotation program), a computer aided design (CAD) program, a labeling program, another type of program suitable for generating the ground truth data 610, and/or may be hand drawn, in some examples. In such an example, the ground truth data 610 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer).

For a second example, the ground truth data 610 may be generated using sensor data 102 generated using one or more sensors of the machine(s). For instance, the ground truth data 610 may be generated using sensor data from a LiDAR sensor(s) since, although generating maps 612 using such sensor data may use a large amount of computing resources, the maps 612 are also very accurate. In such examples, the machine(s) that generates the sensor data 102 that is associated with the training data 602 may also be generating the sensor data 102 that is associated with the ground truth data 610. For instance, the machine(s) may include a number of LiDAR sensors located around the machine(s), such that the LiDAR sensors generate sensor data 102 representing an entirety of the environment surrounding the machine(s). This sensor data 102 may then be used to generate the maps 612, such as the height maps 612, the occupancy maps 612, the height/occupancy maps 612, and/or the like. Additional techniques for generating the ground truth data 610 may is described with respect to U.S. Non-Provisional application Ser. No. 18/060,444, which is hereby incorporated by reference in its entirety.

In some examples, the ground truth data 610 may be generated using one or more techniques based on the augmentation technique(s) that was used to generate at least a portion of the augmented training data 602. For instance, if an instance (e.g., an image) of the augmented training data 602 was generated using the example of FIG. 6B, such as by rotating and/or flipping the sensor data 606 and/or the input data 608, then the ground truth data 610 that corresponds to the instance of the augmented training data 602 may also be rotated by the same angle and/or flipped. For example, if the augmentation component 604 generates the augmented training data 602 by rotating the input data 608 by 90 degrees, then the map(s) 612 associated with the augmented training data 602 may also be rotated by 90 degrees. This way, the ground truth data 610 stays consistent with the augmented training data 602, which may increase the training accuracy associated with the machine learning model(s) 126.

The process 600 may include a training engine 614 using one or more loss functions that measure loss (e.g., error) in outputs 616 generated using the machine learning model(s) 126 as compared to the ground truth data 610. Any type of loss function may be used, such as cross entropy loss, mean squared error, mean absolute error, mean bias error, and/or other loss function types. In some examples, different outputs 616 may have different loss functions. For example, outputs 616 representing a first type of map, such as height maps, may have a first loss function while outputs 616 representing a second type of map, such as occupancy maps, may have a second loss function. In such examples, the loss functions may be combined to form a total loss, and the total loss may be used to train (e.g., update the parameters of) the machine learning model(s) 126. In any example, backward pass computations may be performed to recursively compute gradients of the loss function(s) with respect to training parameters. In some examples, weight and biases of the machine learning model(s) 126 may be used to compute these gradients.

While the example of FIG. 6 illustrates the training engine 614 using the losses to train the machine learning model(s) 126, in some examples, similar processes may be used such that the training engine 614 uses the losses to train (e.g., update the parameters of) the neural network(s) 106 and/or the neural network(s) 114. In such examples, the neural network(s) 106 and/or the neural network(s) 114 may be trained such that the input data 124 used by the machine learning model(s) 126 causes the machine learning model(s) 126 to generate more accurate outputs.

Figure 8:
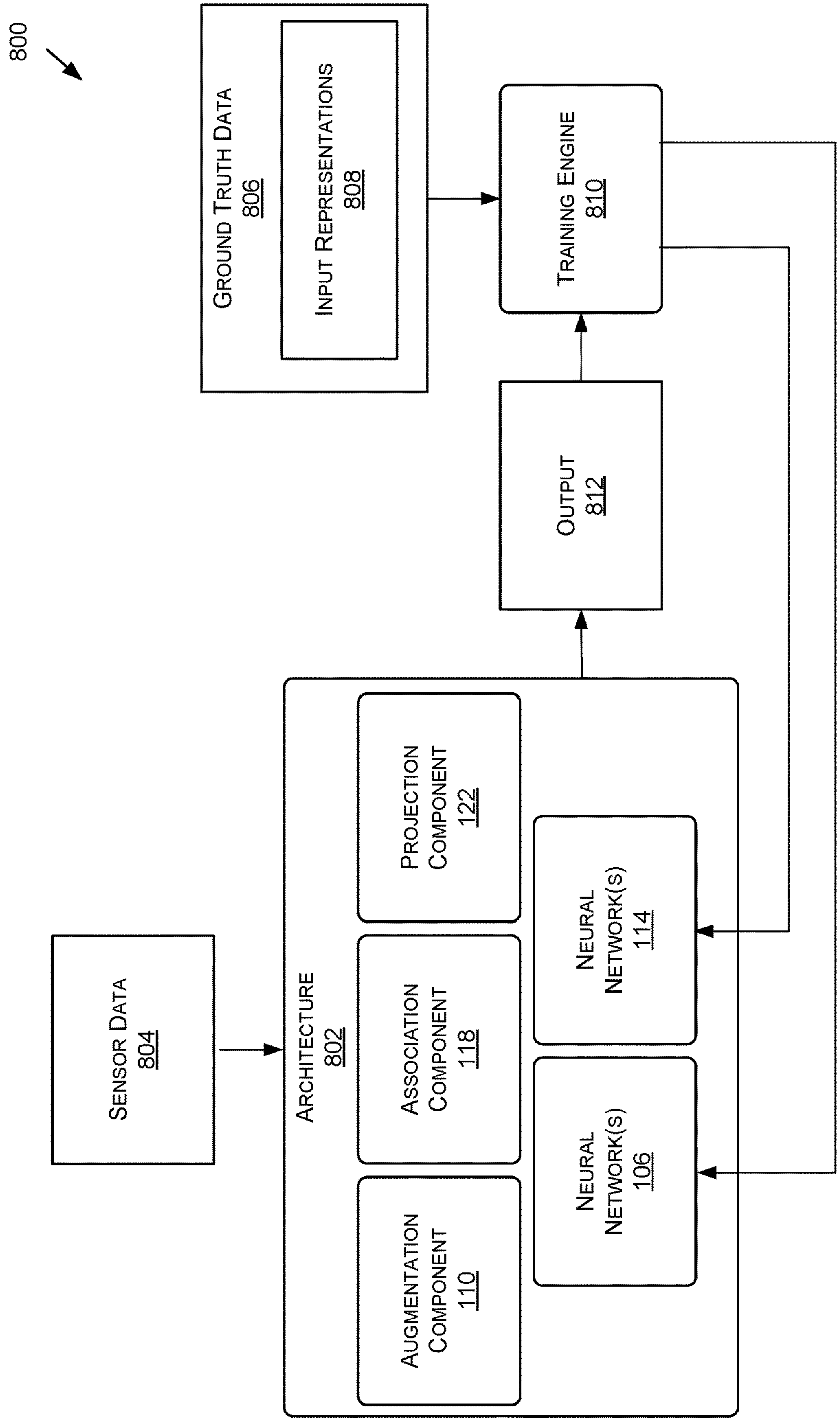
FIG. 8 illustrates a data flow diagram illustrating a process for training one or more neural networks to generate input data for one or more machine learning models, in accordance with some embodiments of the present disclosure.

FIG. 8 is a data flow diagram illustrating a process 800 for training one or more neural networks to generate input data for one or more machine learning models, in accordance with some embodiments of the present disclosure. As shown, an architecture 802 that includes the components from the process 100 may be trained using sensor data 804 (e.g., training sensor data 804). In some examples, the training sensor data 804 may be similar to, and/or include, at least a portion of the sensor data 102. For example, the training sensor data 804 may be generated using one or more ultrasonic sensors associated with one or more machines. In some examples, at least a portion of the sensor data 804 may be augmented using one or more of the processes described herein.

The architecture 802 may be trained using the training sensor data 804 as well as corresponding ground truth data 806. The ground truth data 806 may include maps, annotations, labels, masks, and/or any other type of ground truth data. For instance, in some embodiments, the ground truth data 806 may represent representations 808 corresponding to the type of output that is generated by the architecture 802, such as representations 808 associated with the input data 124. The ground truth data 806 may be generated using one or more techniques. For example, the ground truth data 806 may be generated within a drawing program (e.g., an annotation program), a computer aided design (CAD) program, a labeling program, another type of program suitable for generating the ground truth data 610, and/or may be hand drawn, in some examples. In such an example, the ground truth data 806 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer).

The process 800 may include a training engine 810 using one or more loss functions that measure loss (e.g., error) in outputs 812 generated using the architecture 802 as compared to the ground truth data 806. As described herein, in some examples, the outputs 812 may include and/or be similar to the input data 124. Any type of loss function may be used, such as cross entropy loss, mean squared error, mean absolute error, mean bias error, and/or other loss function types. In some examples, different outputs 812 may have different loss functions. In such examples, the loss functions may be combined to form a total loss, and the total loss may be used to train (e.g., update the parameters of) the neural network(s) 106 and/or the neural network(s) 114. In any example, backward pass computations may be performed to recursively compute gradients of the loss function(s) with respect to training parameters. In some examples, weight and biases of the neural network(s) 106 and/or the neural network(s) 114 may be used to compute these gradients.

While the example of FIG. 8 illustrates using the same outputs 812 to update both the neural network(s) 106 and the neural network(s) 114, in other examples, the outputs 812 generated using outputs (e.g., the output data 108) from the neural network(s) 106 may be used to update the neural network(s) 106 and/or the outputs 812 generated using outputs (e.g., the output data 116) from the neural network(s) 114 may be used go update the neural network(s) 114.

Figure 9:
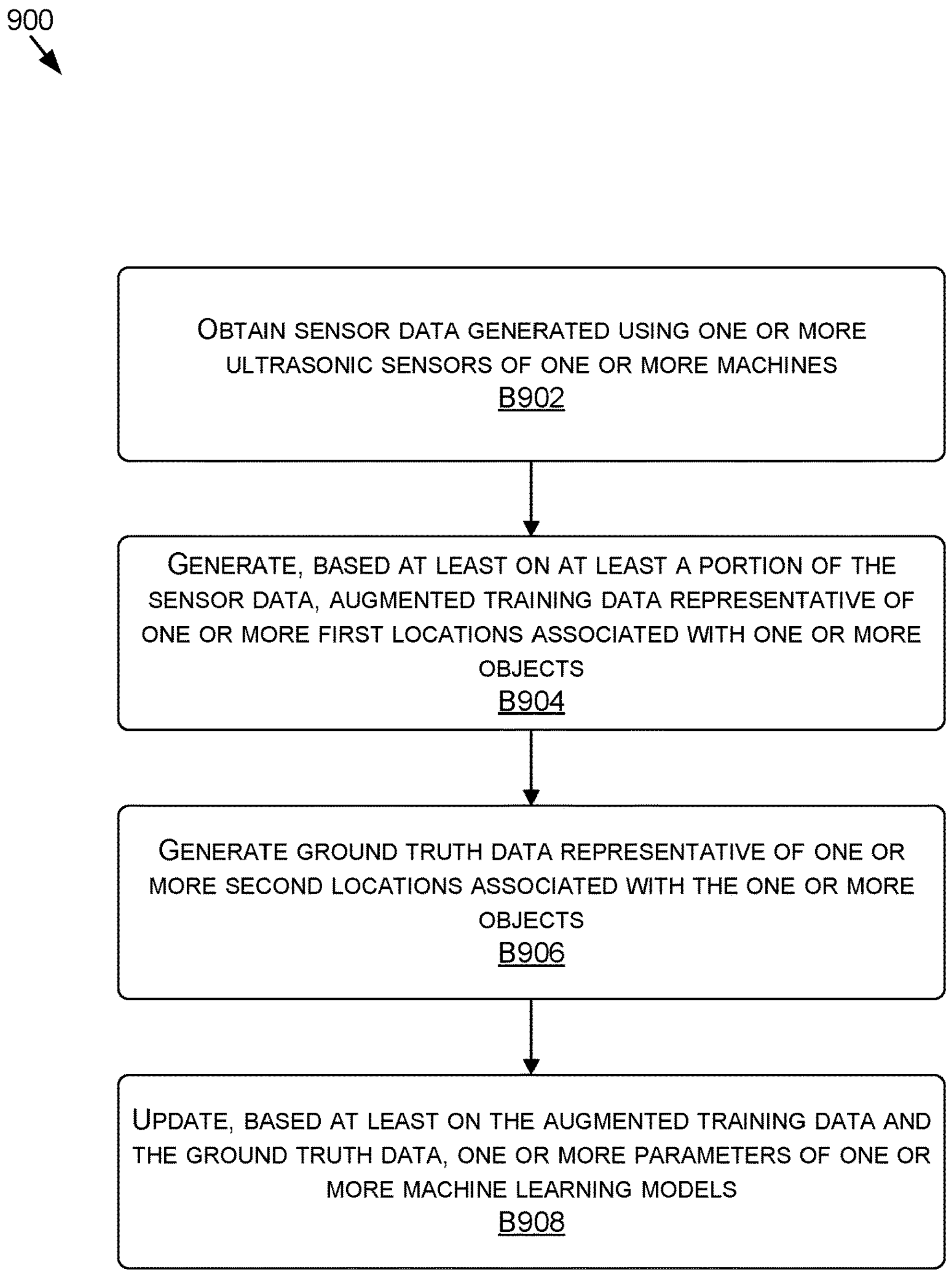
FIG. 9 illustrates a flow diagram showing a method for using augmented input data to train one or more machine learning models, in accordance with some embodiments of the present disclosure.
Figure 10:
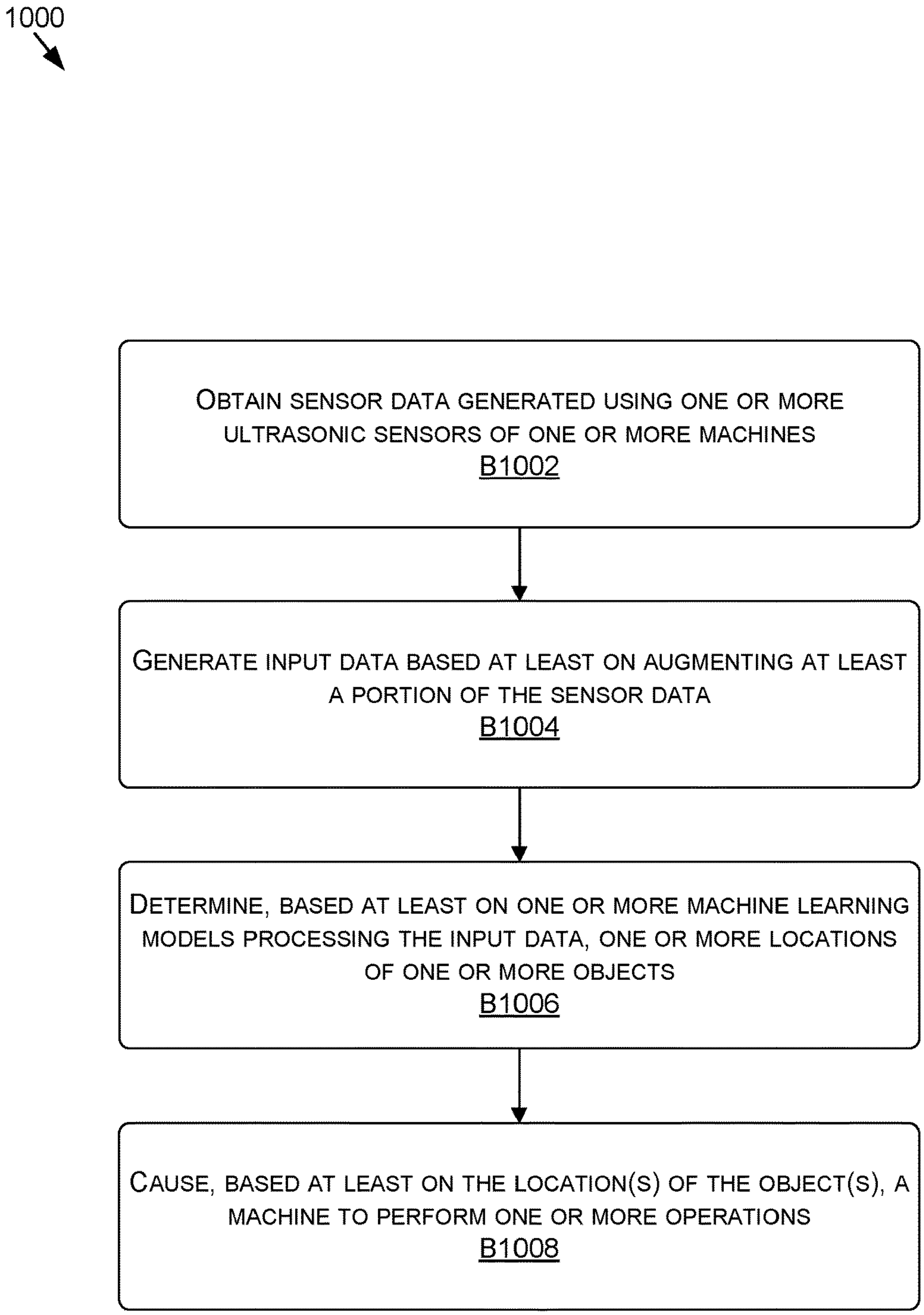
FIG. 10 illustrates a flow diagram showing a method for using augmented input data to determine information associated with an environment, in accordance with some embodiments of the present disclosure.

Now referring to FIGS. 9 and 10, each block of methods 900 and 1000, described herein, comprises a computing process that may be performed using any combination of hardware, firmware, and/or software. For instance, various functions may be carried out by a processor executing instructions stored in memory. The methods 900 and 1000 may also be embodied as computer-usable instructions stored on computer storage media. The methods 900 and 1000 may be provided by a standalone application, a service or hosted service (standalone or in combination with another hosted service), or a plug-in to another product, to name a few. In addition, the methods 900 and 1000 are described, by way of example, with respect to FIGS. 1 and 6. However, these methods 900 and 1000 may additionally or alternatively be executed by any one system, or any combination of systems, including, but not limited to, those described herein.

FIG. 9 illustrates a flow diagram showing a method 900 for using augmented ultrasonic data to train one or more machine learning models, in accordance with some embodiments of the present disclosure. The method 900, at block B902, may include obtaining sensor data generated using one or more ultrasonic sensors of one or more machines. For instance, a system(s) (e.g., the data center 1300, etc.) may receive the sensor data 606 generated using the ultrasonic sensor(s). As described herein, in some examples, the sensor data 606 may represent a histogram(s) indicating the distance(s) to the object(s) located within the environment. For example, a histogram may be associated with a number of bins (e.g., 50 bins, 100 bins, 200 bins, 300 bins, 400 bins, etc.), where each bin is associated with a respective distance within the environment. Additionally, the histogram may indicate amplitude values associated with a frequency signal, where one or more peak amplitude values associated with the frequency signal may indicate the location(s) of the object(s) within the environment.

The method 900, at block B904, may include generating, based at least on a portion of the sensor data, augmented training data representative of one or more first locations associated with one or more objects. For instance, the system(s) (e.g., the augmentation component 110 and/or the augmentation component 604) may generate the training data 602 by augmenting at least a portion of the sensor data 606 and/or at least a portion of the input data 608 generated using the sensor data 606. For instance, the system(s) may generate the training data 602 by adding information to the sensor data 606, adding noise the sensor data 606, changing a pose associated with the ultrasonic sensor(s) that generated the sensor data 606 such that the ultrasonic sensor(s) is located at a different position on the machine(s), changing one or more yaw angles associated with the ultrasonic sensor(s), and/or performing any other augmentation technique.

The method 900, at block B906, may include generating ground truth data representative of one or more second locations associated with the one or more objects. For instance, the system(s) may generate the ground truth data 610 representative of the second location(s) of the object(s). As described herein, the ground truth data 610 may include maps, annotations, labels, masks, and/or any other type of ground truth data. Additionally, in some examples, at least a portion of the ground truth data 610 may be updated based on the augmentation technique associated with at least a portion of the training data 602.

The method 900, at block B908, may include updating, based at least on the training data and the ground truth data, one or more parameters of one or more machine learning models. For instance, the system(s) may update the parameter(s) of the machine learning model(s) 126 using at least the training data 602 and the ground truth data 610. As described herein, in some examples, to update the parameter(s), the system(s) may determine one or more losses using the outputs 616 from the machine learning model(s) 126 processing the training data 602 and the ground truth data 610. The system(s) may then update the parameter(s) using the loss(es).

FIG. 10 illustrates a flow diagram showing a method 1000 for using augmented ultrasonic data to determine information associated with an environment, in accordance with some embodiments of the present disclosure. The method 1000, at block B1002, may include obtaining sensor data generated using one or more ultrasonic sensors of one or more machines. For instance, a system(s) (e.g., the data center 1300, etc.) may receive the sensor data 606 generated using the ultrasonic sensor(s). As described herein, in some examples, the sensor data 606 may represent a histogram(s) indicating the distance(s) to the object(s) located within the environment. For example, a histogram may be associated with a number of bins (e.g., 50 bins, 100 bins, 200 bins, 300 bins, 400 bins, etc.), where each bin is associated with a respective distance within the environment. Additionally, the histogram may indicate amplitude values associated with a frequency signal, where one or more peak amplitude values associated with the frequency signal may indicate the location(s) of the object(s) within the environment.

The method 1000, at block B1004, may include generating input data based at least on augmenting at least a portion of the sensor data. For instance, the system(s) (e.g., the augmentation component 110) may generate the input data 124 by augmenting at least a portion of the sensor data 102 and/or at least a portion of the input data 124 generated using the sensor data 102. For instance, the system(s) may generate the input data 124 by adding information to the sensor data 102, adding noise the sensor data 102, changing a pose associated with the ultrasonic sensor(s) that generated the sensor data 102 such that the ultrasonic sensor(s) is located at a different position on the machine(s), changing one or more yaw angles associated with the ultrasonic sensor(s), and/or performing any other augmentation technique.

The method 1000, at block B1006, may include determining, based at least on one or more machine learning models processing the input data, one or more locations of one or more objects. For instance, the system(s) may apply the input data 124 to the machine learning model(s) 126. The machine learning model(s) 126 may then process the input data 124 and, based at least on the processing, determine the location(s) of the object(s). As described herein, the machine learning model(s) 126 may generate a map indicating the location(s) of the object(s), such as a height map(s), an occupancy map(s), a height/occupancy map(s), a distance map(s), and/or any other type of map The method 1000, at block B1008, may include causing, based at least on the location(s) of the object(s), a machine to perform one or more operations. For instance, the system(s) may use the location(s) of the object(s) to determine a trajectory for the machine through an environment. The system(s) may then cause the machine to navigate according to the trajectory.

Example Autonomous Vehicle

Figure 11A:
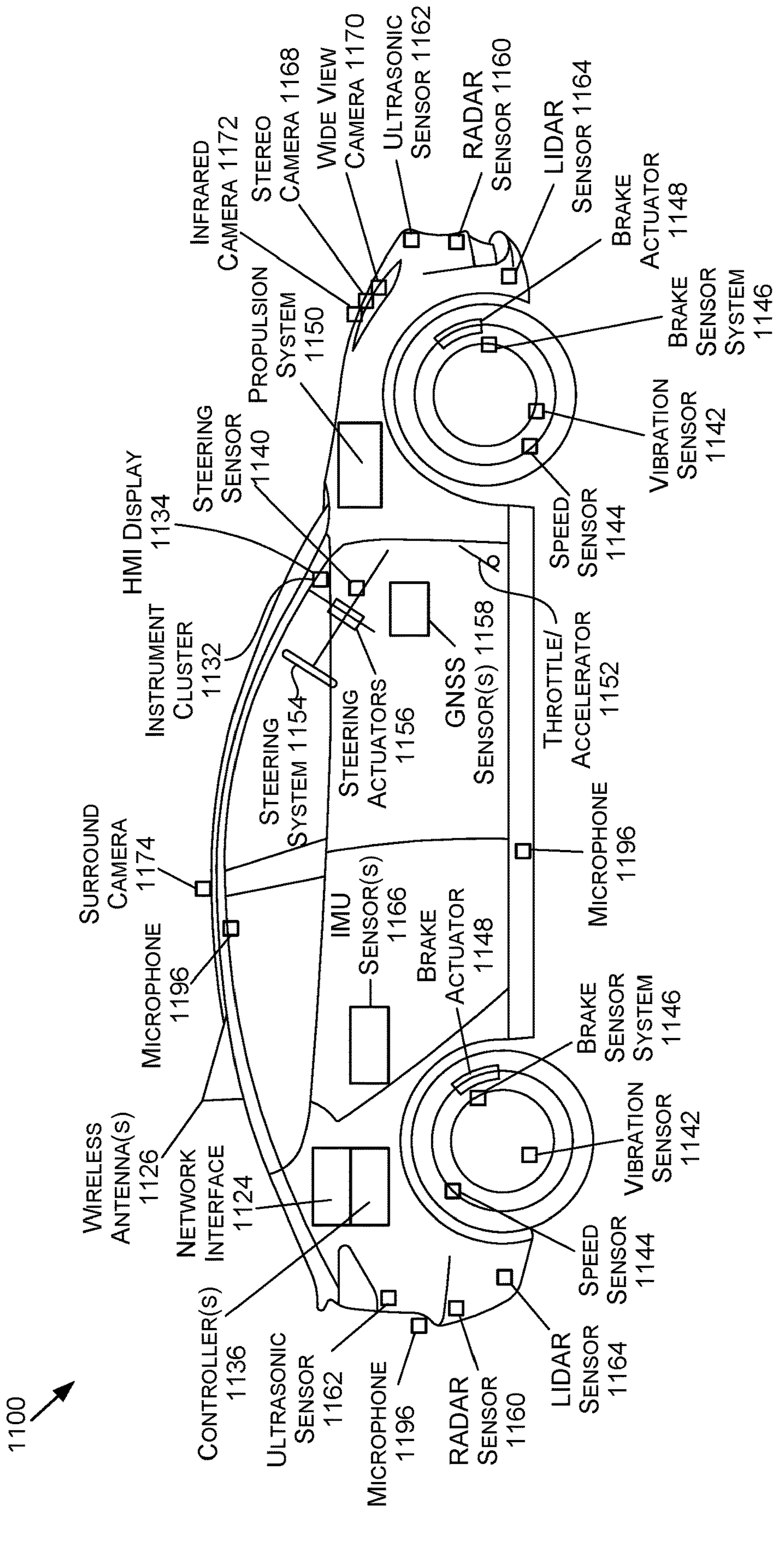
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
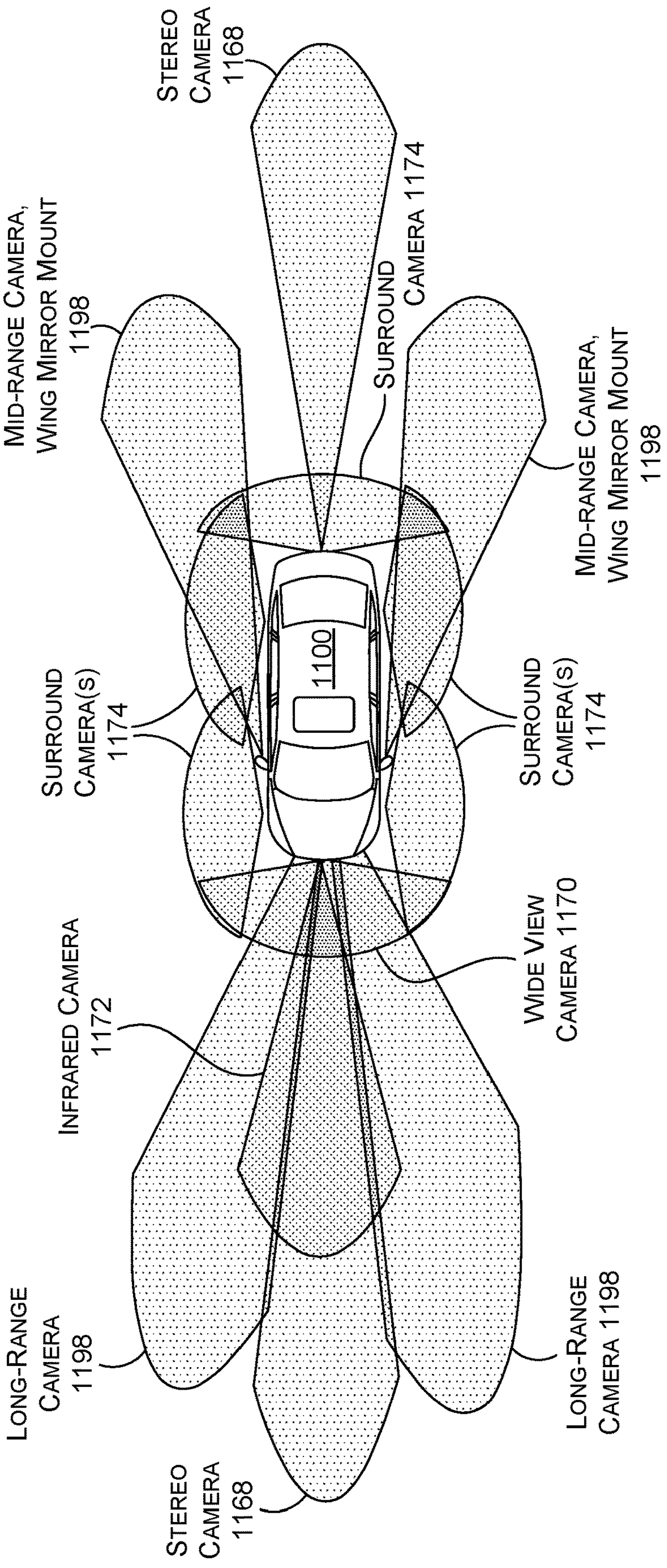
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
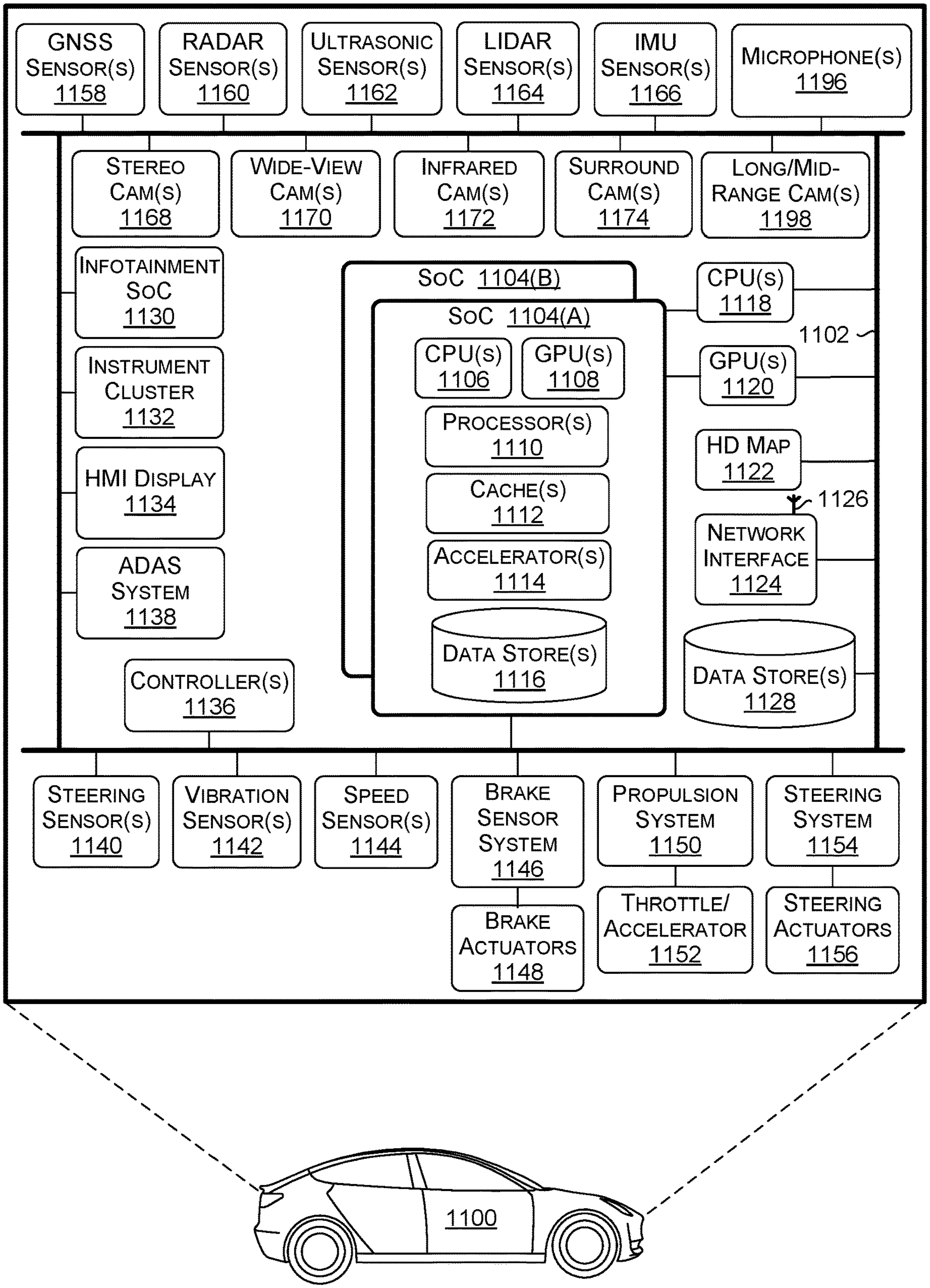
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
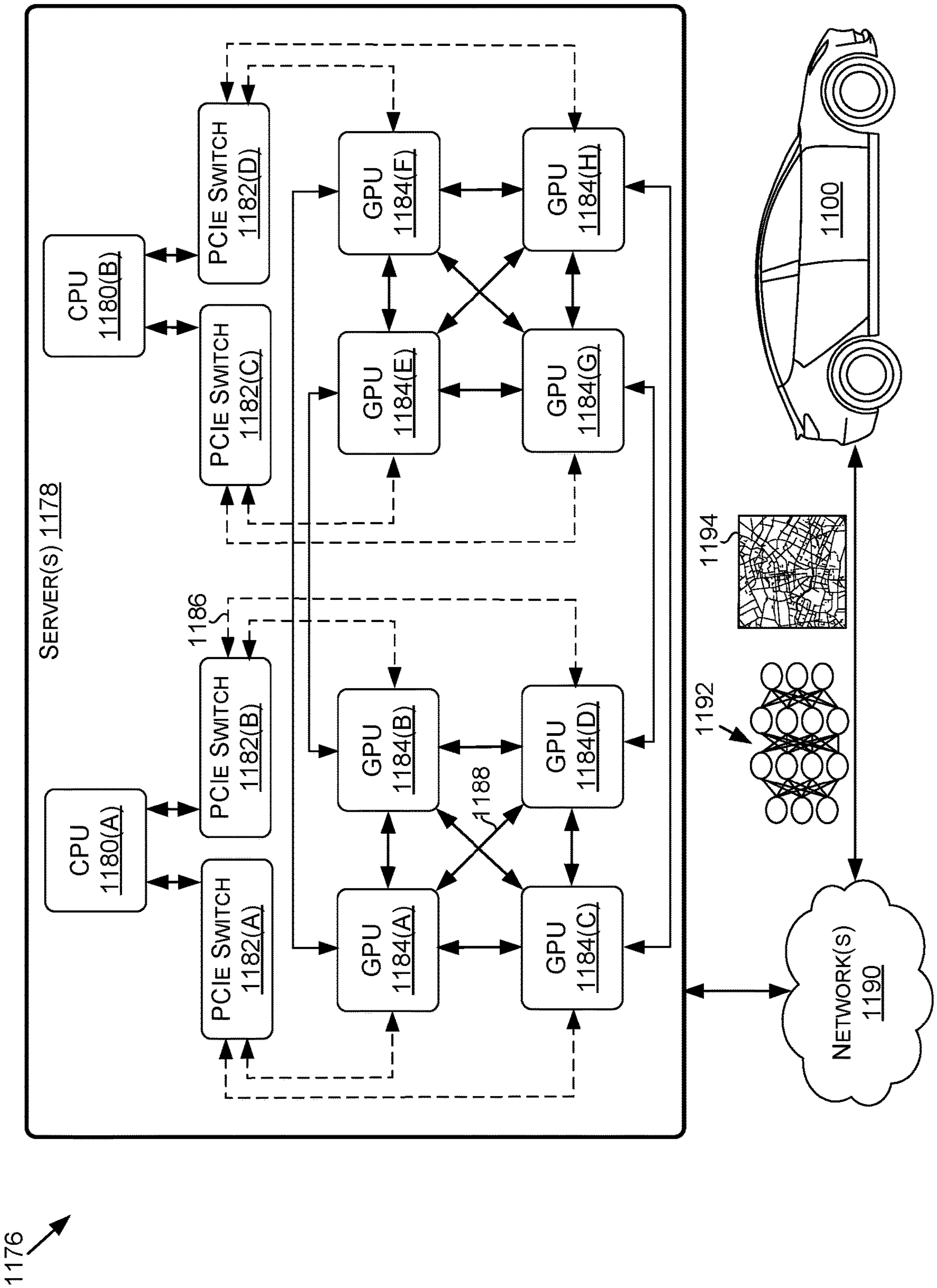
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
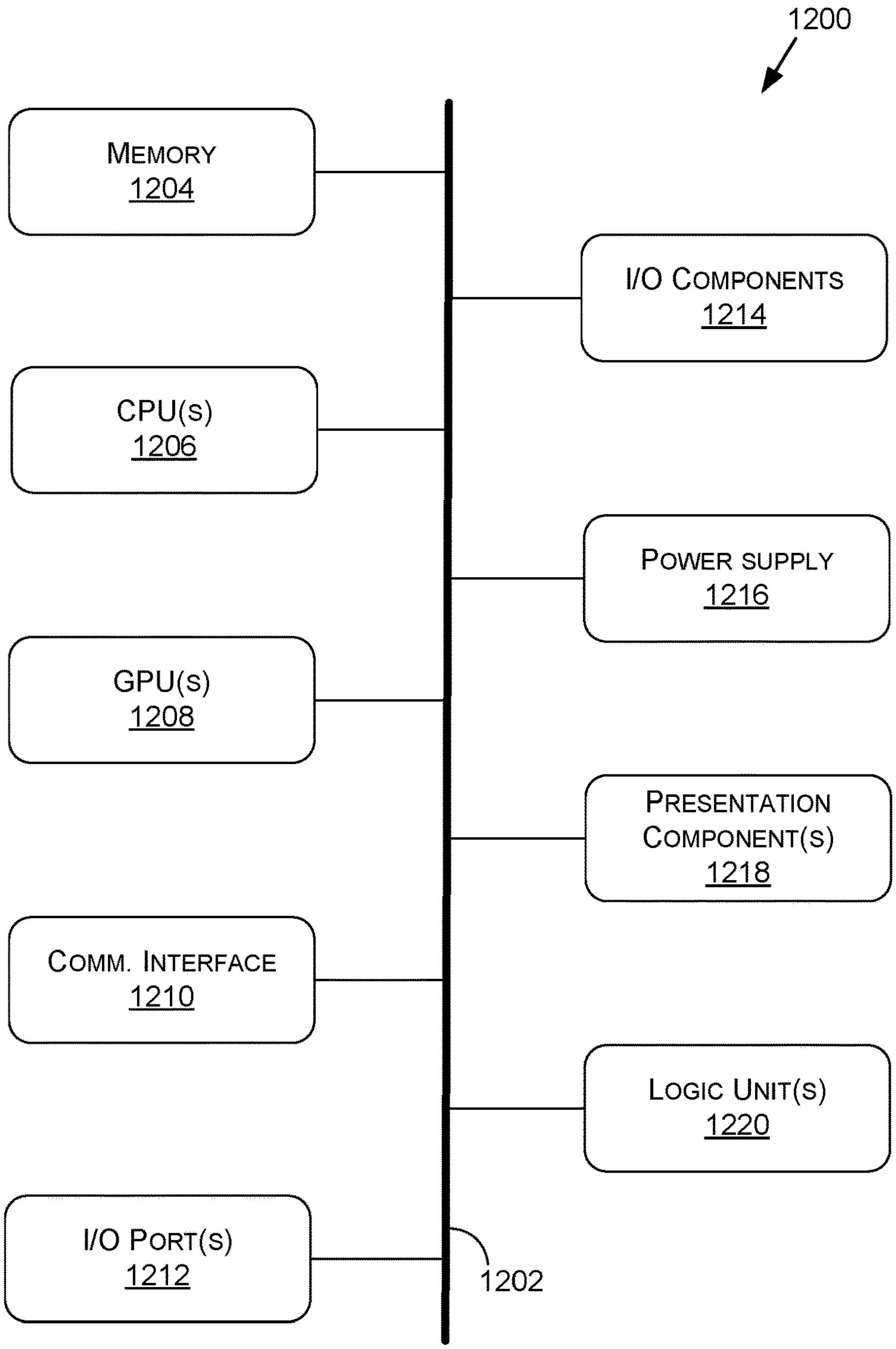
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM)

processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
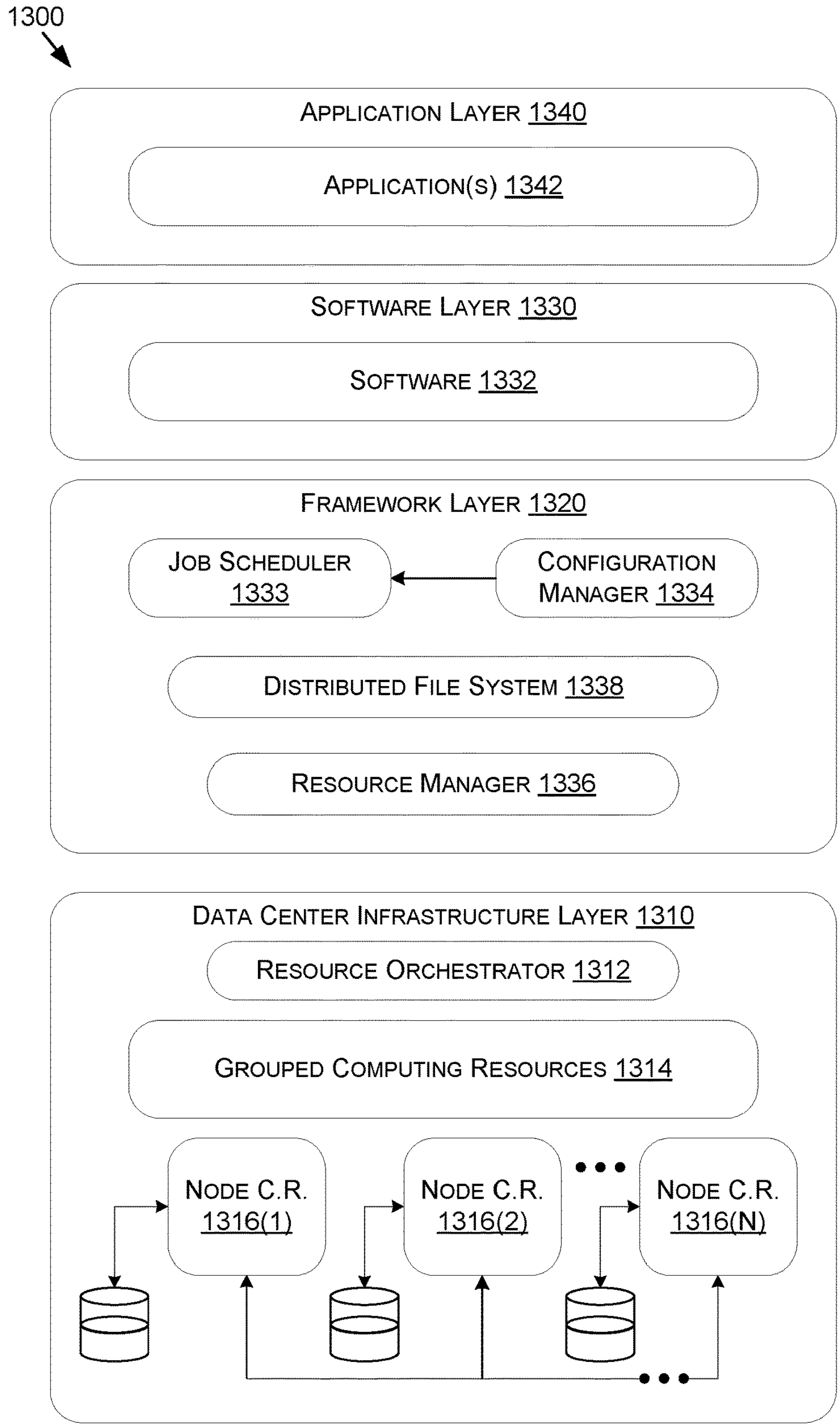
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161 (N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

EXAMPLE PARAGRAPHS

A: A method comprising: determining, using one or more machine learning models processing first sensor data generated using one or more first ultrasonic sensors, one or more locations associated with one or more first objects or features located within an environment, wherein the one or more machine learning models are trained, at least, by: obtaining second sensor data generated using one or more second ultrasonic sensors associated with one or more machines; generating, based at least on augmenting at least a portion of the second sensor data, training data representative of one or more second locations associated with one or more second objects or features; generating ground truth data representative of one or more third locations associated with the one or more second objects or features; and updating, based at least on the training data and the ground truth data, one or more parameters of the one or more machine learning models.

B: The method of paragraph A, wherein: the second sensor data represents one or more first histograms; and the generating the training data comprises: generating, based at least on adding noise to the one or more first histograms, third sensor data representative of one or more second histograms; and generating, based at least the third sensor data, the training data representative of the one or more second locations associated with the one or more second objects or features.

C: The method of either paragraph A or paragraph B, wherein the generating the training data comprises: determining one or more first poses associated with the one or more second ultrasonic sensors when generating the second sensor data; determining, based at least on the one or more first poses, one or more second poses associated with the one or more second ultrasonic sensors; and generating, based at least on the second sensor data and the one or more second poses, the training data representative of the one or more second locations associated with the one or more second objects or features.

D: The method of any one of paragraph A-C, wherein the generating the training data comprises: determining one or more first yaw angles associated with the one or more second ultrasonic sensors when generating the second sensor data; determining, based at least on the one or more first yaw angles, one or more second yaw angles; generating one or more projection matrices representative of at least the one or more second yaw angles; and generating, based at least on the second sensor data and the one or more projection matrices, the training data representative of the one or more second locations associated with the one or more second objects or features.

E: The method of any one of paragraphs A-D, wherein the generating the training data comprises: associating the second sensor data with data representative of information, the information including at least one of: one or more extrinsic parameters associated with the one or more second ultrasonic sensors; one or more intrinsic parameters associated with the one or more second ultrasonic sensors; volumetric information associated with the one or more second ultrasonic sensors; one or more modes associated with the one or more second ultrasonic sensors; one or more indications of one or more median amplitude values associated with the second sensor data; one or more indications of one or more peak amplitude values associated with the second sensor data; one or more indications of one or more distances associated with the second sensor data; one or more indications of one or more variance amplitude values associated with the second sensor data; or one or more indications of one or more mean amplitude values associated with the second sensor data; and generating, based at least on the second sensor data and the data representative of the information, the training data representative of the one or more second locations associated with the one or more second objects or features.

F: A system comprising: one or more processors to: obtain sensor data generated using one or more ultrasonic sensors of one or more machines; generate input data based at least on augmenting at least a portion of the sensor data; generate, based at least on one or more machine learning models processing the input data, output data representative of one or more locations associated with one or more objects of features; and perform one or more operations based at least on the output data.

G: The system of paragraph F, wherein the generation of the input data comprises: causing the sensor data to be associated with augmentation data representative of information associated with at least one of the one or more ultrasonic sensors or one or more histograms represented by the sensor data; generating, based at least on one or more neural networks processing the sensor data and the augmentation data, one or more outputs; and generating the input data based at least on the one or more outputs.

H: The system of paragraph G, wherein the information includes one or more of: one or more extrinsic parameters associated with the one or more ultrasonic sensors; one or more intrinsic parameters associated with the one or more ultrasonic sensors; volumetric information associated with the one or more ultrasonic sensors; one or more modes associated with the one or more ultrasonic sensors; one or more indications of one or more median amplitude values associated with the sensor data; one or more indications of one or more peak amplitude values associated with the sensor data; one or more indications of one or more distances associated with the sensor data; one or more indications of one or more variance amplitude values associated with the sensor data; or one or more indications of one or more mean amplitude values associated with the sensor data.

I: The system of paragraph G, wherein the one or more processors are further to: generate, based at least on one or more second neural networks processing second sensor data corresponding to the sensor data, one or more second outputs, wherein the input data is further generated based at least on the one or more second outputs.

J: The system of any one of paragraphs F-I, wherein the one or more processors are further to: generate second input data based at least on second sensor data corresponding to the sensor data, wherein the output data is further generated based at least on the one or more machine learning models processing the second input data.

K: The system of any one of paragraphs F-J, wherein the output data represents one or more maps indicating the one or more locations associated with the one or more objects, the one or more maps including at least one of: one or more height maps; one or more occupancy maps; or one or more distance maps.

L: The system of any one of paragraphs F-K, wherein the performance of the one or more operations comprises: determining a trajectory based at least on the one or more locations associated with the one or more objects; and causing a machine to navigate according to the trajectory.

M: The system of any one of paragraphs F-L, wherein the performance of the one or more operations comprises: determining, based at least on the one or more locations of the one or more objects or features and one or more second locations for the one or more objects or features as represented by ground truth data, one or more losses;

and updating, based at least on the one or more losses, one or more parameters associated with the one or more machine learning models.

N: The system of any one of paragraphs F-M, wherein: the sensor data represents one or more first histograms; and the generation of the input data comprises: generating, based at least on adding noise to the one or more first histograms, second sensor data representative of one or more second histograms; and generating the input data based at least the second sensor data.

O: The system of any one of paragraphs F-N, wherein the generation of the input data comprises: determining one or more first poses associated with the one or more ultrasonic sensors when generating the sensor data; determining, based at least on the one or more first poses, one or more second poses associated with the one or more ultrasonic sensors; and generating the input data based at least on the sensor data and the one or more second poses.

P: The system of any one of paragraphs F-O, wherein the generation of the input data comprises: determining one or more first yaw angles associated with the one or more ultrasonic sensors when generating the sensor data; determining, based at least on the one or more first yaw angles, one or more second yaw angles; generating one or more projection matrices representative of at least the one or more second yaw angles; and generating the input data based at least on the sensor data and the one or more projection matrices.

Q: The system of any one of paragraphs F-P, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more visual language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

R: One or more processors comprising: processing circuitry to cause performance of one or more operations based at least on output data generated using one or more machine learning models processing input data, wherein at least a first portion of the input data is generated using first sensor data generated using one or more ultrasonic sensors and at least a second portion of the input data is generated using one or more outputs from one or more neural networks processing second sensor data corresponding to the first sensor data.

S: The one or more processors of paragraph R, wherein the one or more operations comprise one or more of: causing a machine to navigate along a trajectory that is determined based at least on the output data; or updating one or more parameters associated with the one or more machine learning models based at least on the output data and ground truth data associated with the first sensor data.

T: The one or more processors of either paragraph R or paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more visual language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

Any, some and/or all features in one aspect of the disclosure may be applied to other aspects of the disclosure, in any appropriate combination or sub-combination. In particular, device aspects may be applied to method aspects, and vice versa. It should also be appreciated that particular combinations of the various features described and defined in any aspect or embodiment of the disclosure can be implemented and/or supplied and/or used independently.

The various features described in the description as optional—such as by use of "may" or "can"—may be combined into a single embodiment, and/or any combination of the features may be combined to form various embodiments that rely on the combination of these various optional features.

What is claimed is:

1. A system comprising:

one or more processors to:

update at least a first bin and a second bin of a histogram using sensor data obtained using one or more ultrasonic sensors of a machine;

determining, based at least on the sensor data, one or more first amplitude values associated with the first bin and one or more second amplitude values associated with the second bin;

determine, based at least on the one or more first amplitude values, first information associated with the first bin;

determine, based at least on the one or more second amplitude values, second information associated with the second bin;

generate input data based at least on augmenting the histogram by at least associating the first bin with the first information and associating the second bin with the second information;

generate, based at least on one or more machine learning models processing the input data, output data representative of one or more locations associated with one or more objects or features; and control, based at least on the output data, the machine to navigate within an environment.

2. The system of claim 1, wherein the generation of the input data comprises:

generating, based at least on one or more neural networks processing data representing the histogram as augmented, one or more outputs; and generating the input data based at least on the one or more outputs.

3. The system of claim 1, wherein the first information includes one or more of:

an indication of a median amplitude value associated with the first bin;

an indication of a peak amplitude value associated with the first bin;

an indication of a distance associated with the first bin;

an indication of a variance amplitude value associated with the first bin; or an indication of a mean amplitude value associated with the first bin.

4. The system of claim 2, wherein the one or more processors are further to:

generate, based at least on one or more second neural networks processing second sensor data corresponding to the sensor data, one or more second outputs, wherein the input data is further generated based at least on the one or more second outputs.

5. The system of claim 1, wherein the one or more processors are further to:

generate second input data based at least on second sensor data corresponding to the sensor data, wherein the output data is further generated based at least on the one or more machine learning models processing the second input data.

6. The system of claim 1, wherein the output data represents one or more maps indicating the one or more locations associated with the one or more objects or features, the one or more maps including at least one of:

one or more height maps;

one or more occupancy maps; or one or more distance maps.

7. The system of claim 1, wherein the one or more processors are further to:

determine one or more parameters associated with the one or more ultrasonic sensors, wherein the input data is further generated by augmenting the histogram with data representative of the one or more parameters.

8. The system of claim 1, wherein:

the histogram is associated with a first time;

the one or more processors are further to update a second histogram using second sensor data obtained using the one or more ultrasonic sensors, the second histogram associated with a second time; and the at least the first information and the second information are further determined based at least on the second histogram.

9. The system of claim 1, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more visual language models (VLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

10. One or more processors comprising:

processing circuitry to:

update at least bins of a histogram using sensor data obtained one or more ultrasonic sensors of a machine;

determine, based at least on the sensor data, amplitude values associated with the bins;

determined, based at least on the amplitude values, information associated with the bins;

generate input data based at least on augmenting the histogram by at least associating the bins with the information;

generate, based at least on one or more machine learning models processing the input data, output data representative of one or more locations associated with one or more objects or features; and control, based at least on the output data, the machine to navigate within an environment.

11. The one or more processors of claim 10, wherein the generation of the input data comprises:

generating, based at least on one or more neural networks processing the histogram as augmented, one or more outputs; and generating the input data based at least on the one or more outputs.

12. The one or more processors of claim 10, wherein the one or more processors are comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more visual language models (VLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

13. A method comprising:

updating bins of a histogram using sensor data obtained using one or more ultrasonic sensors of a machine;

determine based at least on the sensor data, amplitude values associated with the bins;

determining, based at least on the amplitude values, information associated with the bins;

generating input data based at least on augmenting the histogram with augmentation data representing the information;

generating, based at least on one or more machine learning models processing the input data, output data representative of one or more locations associated with one or more objects or features; and controlling, based at least on the output data, the machine to navigate within an environment.

14. The method of claim 13, wherein the generating the input data comprises:

generating, based at least on one or more neural networks processing the histogram and the augmentation data, one or more outputs; and generating the input data based at least on the one or more outputs.

15. The method of claim 13, further comprising:

generating, based at least on one or more neural networks processing second sensor data corresponding to the sensor data, one or more outputs, wherein the generating the input data is further based at least on the one or more outputs.

16. The method of claim 13, further comprising determine one or more parameters associated with the one or more ultrasonic sensors, wherein the generating the input data is further by augmenting the histogram with second augmentation data representative of the one or more parameters.

17. The method of claim 13, wherein the determining the information associated with the one or more bins comprises:

determining, based at least on the sensor data, one or more amplitude values associated with the one or more bins; and determining, based at least on the one or more amplitude values, the information associated with the one or more bins.

18. The method of claim 13, wherein the determining the information associated with the one or more bins comprises:

determining, based at least on the sensor data, one or more first amplitude values associated with a first bin of the one or more bins and one or more second amplitude values associated with a second bin of the one or more bins;

determining, based at least on the one or more first amplitude values, a first portion of the information that is associated with the first bin; and determining, based at least on the one or more second amplitude values, a second portion of the information that is associated with the second bin.

19. The method of claim 13, wherein:

the histogram is associated with a first time;

the method further comprises updating a second histogram using second sensor data obtained using the one or more ultrasonic sensors; and the determining the information is further based at least on the second sensor data.

* * * * *